United States Patent
Maimone et al.

(10) Patent No.: US 11,561,510 B1
(45) Date of Patent: Jan. 24, 2023

(54) HOLOGRAPHIC NEAR-EYE DISPLAY HAVING PUPIL STEERING

(71) Applicant: Meta Platforms Technologies, LLC, Menlo Park, CA (US)

(72) Inventors: Andrew Maimone, Menlo Park, CA (US); Gang Li, Menlo Park, CA (US); Afsoon Jamali, Menlo Park, CA (US); Changwon Jang, Menlo Park, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 627 days.

(21) Appl. No.: 16/517,535

(22) Filed: Jul. 19, 2019

(51) Int. Cl.
G03H 1/08 (2006.01)
G03H 1/22 (2006.01)
(Continued)

(52) U.S. Cl.
CPC .......... *G03H 1/2294* (2013.01); *G03H 1/02* (2013.01); *G06F 3/016* (2013.01); *G03H 2001/0077* (2013.01); *G03H 2001/0224* (2013.01)

(58) Field of Classification Search
CPC .. G03H 1/0248; G03H 1/0272; G03H 1/0256; G03H 1/0808; G03H 1/2294; G03H 1/02; G03H 2001/0495; G03H 2001/0077; G03H 2001/0224; G03H 2250/41; G03H 2250/00; G03H 2270/55; G03H 2270/22; G03H 2270/20; G03H 2270/21; G03H 2240/15; G03H 2222/31; G03H 2223/23; G03H 2225/30–34; G03H 2226/05; G02B 27/0172; G02B 27/283; G02B 27/0093; G02B 27/0174; G02B 27/017; G02B 27/286; G02B 27/4261; G02B 2027/0178; G02B 2027/0138; G02B 2027/0107; G02B 2027/0103; G02B 5/30; G02B 5/3016; G02B 5/3083; G02B 5/32; G02B 5/3025; G02B 2005/1804; G06F 3/013; G06F 3/016
(Continued)

(56) References Cited

U.S. PATENT DOCUMENTS 10,451,947 B1  10/2019  Lu et al.
2010/0149073 A1*  6/2010  Chaum ............... G02B 27/0172
                                                              345/8
(Continued)

OTHER PUBLICATIONS

Oh, C., et al. "Achromatic diffraction from polarization gratings with high efficiency," Optics Letters, Vo. 33, , No. 20, 2287-2289 (Oct. 15, 2008), 3 pages.

*Primary Examiner* — Jade R Chwasz
*Assistant Examiner* — Jyotsna V Dabbi
(74) *Attorney, Agent, or Firm* — Millburn IP PLLC

(57) ABSTRACT

An optical device includes a light source configured to provide a light beam. The optical device includes a light source configured to generate a light beam, and a spatial light modulator ("SLM") configured to modulate the light beam to provide a hologram for generating a display image. The optical device includes a polarization-selective steering assembly configured to provide a plurality of steering states for the modulated light beam. The optical device includes an image combiner configured to focus the modulated light beam steered by the polarization-selective steering assembly to generate an array of spots at an eye-box of the optical device.

20 Claims, 17 Drawing Sheets

(51) Int. Cl.
  *G06F 3/01* (2006.01)
  *G03H 1/02* (2006.01)
  *G03H 1/00* (2006.01)

(58) Field of Classification Search
  USPC .......................................................... 359/9
  See application file for complete search history.

(56) References Cited

U.S. PATENT DOCUMENTS

| | | | |
|---|---|---|---|
| 2010/0238529 A1* | 9/2010 | Sampsell | G03H 1/0408 359/15 |
| 2016/0327796 A1* | 11/2016 | Bailey | G03H 1/2645 |
| 2018/0081322 A1* | 3/2018 | Robbins | G03H 1/0005 |
| 2018/0113309 A1* | 4/2018 | Robbins | G02B 6/124 |
| 2018/0188688 A1* | 7/2018 | Maimone | G03H 1/0808 |
| 2018/0239177 A1* | 8/2018 | Oh | G02B 27/0172 |

* cited by examiner

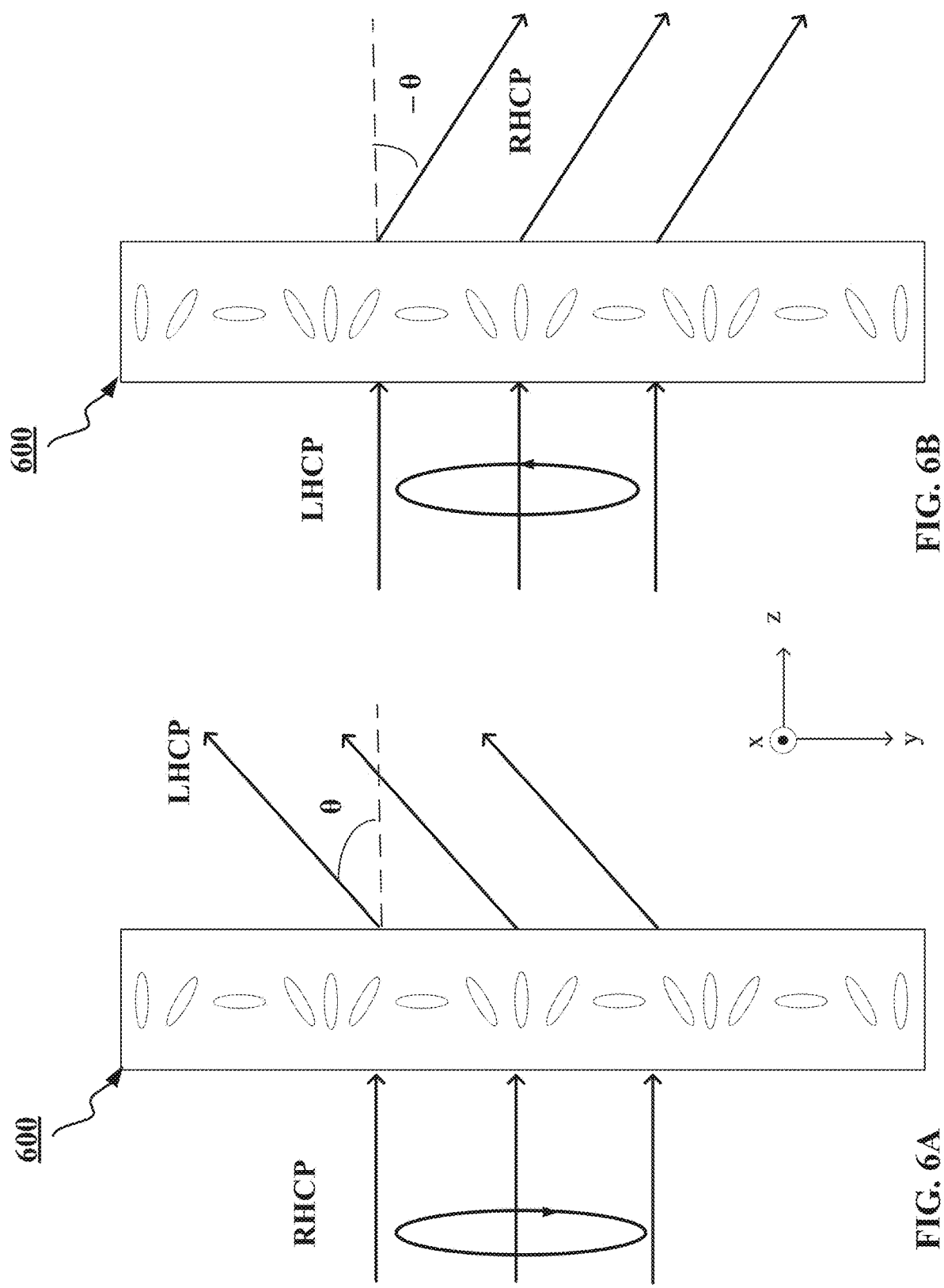

| State # | In | SHW1 | PBP1 | SHW2 | PBP2 | SHW3 | PBP3 | SHW4 | PBP4 | SHW5 | Out | θ | Binary State |
|---|---|---|---|---|---|---|---|---|---|---|---|---|---|
| 1 | RHCP | 1 | -1° | 1 | -2° | 1 | -4° | 1 | -8° | 0 | RHCP | -15° | 11110 |
| 2 | RHCP | 0 | +1° | 0 | -2° | 1 | -4° | 1 | -8° | 0 | RHCP | -13° | 00110 |
| 3 | RHCP | 1 | -1° | 0 | +2° | 0 | -4° | 1 | -8° | 0 | RHCP | -11° | 10010 |
| 4 | RHCP | 0 | +1° | 1 | +2° | 0 | -4° | 1 | -8° | 0 | RHCP | -9° | 01010 |
| 5 | RHCP | 1 | -1° | 1 | -2° | 0 | +4° | 1 | -8° | 0 | RHCP | -7° | 11000 |
| 6 | RHCP | 0 | +1° | 0 | -2° | 0 | +4° | 1 | -8° | 0 | RHCP | -5° | 00000 |
| 7 | RHCP | 1 | -1° | 0 | +2° | 1 | +4° | 1 | -8° | 0 | RHCP | -3° | 10100 |
| 8 | RHCP | 0 | +1° | 1 | +2° | 1 | +4° | 1 | -8° | 0 | RHCP | -1° | 01100 |
| 9 | RHCP | 1 | -1° | 1 | -2° | 1 | -4° | 0 | +8° | 1 | RHCP | +1° | 11101 |
| 10 | RHCP | 0 | +1° | 0 | -2° | 1 | -4° | 0 | +8° | 1 | RHCP | +3° | 00101 |
| 11 | RHCP | 1 | -1° | 0 | +2° | 0 | -4° | 0 | +8° | 1 | RHCP | +5° | 10001 |
| 12 | RHCP | 0 | +1° | 1 | +2° | 0 | -4° | 0 | +8° | 1 | RHCP | +7° | 01001 |
| 13 | RHCP | 1 | -1° | 1 | -2° | 0 | +4° | 1 | +8° | 1 | RHCP | +9° | 11011 |
| 14 | RHCP | 0 | +1° | 0 | -2° | 0 | +4° | 1 | +8° | 1 | RHCP | +11° | 00011 |
| 15 | RHCP | 1 | -1° | 0 | +2° | 1 | +4° | 1 | +8° | 1 | RHCP | +13° | 10111 |
| 16 | RHCP | 0 | +1° | 1 | +2° | 1 | +4° | 1 | +8° | 1 | RHCP | +15° | 01111 |

FIG. 10

HOLOGRAPHIC NEAR-EYE DISPLAY HAVING PUPIL STEERING

BACKGROUND

Holographic displays can provide natural monocular focus cues and a high resolution as well as vision-correction ability, making them strong candidates for near-eye displays ("NEDs"). Optical see-through holographic display is a key device for augmented reality ("AR") applications and mixed reality ("MR") applications. However, the limited bandwidth of spatial light modulator ("SLM") has been an important bottleneck of holographic display technology that limits performance. In particular, the limited SLM bandwidth imposes a critical trade-off between field of view ("FOV") and eye-box size for near-eye displays, because the product of the FOV and the eye-box size made by the system is often constant, which is determined by the size and pixel pitch of the SLM.

It is often desirable to have a large FOV in a holographic display to provide immersive user experience. However, enlarging the FOV may directly reduce the eye-box size. For example, the typical eye-box size of a commercially available 2k SLM is approximately 1 mm for a 60-degree FOV, and the pupil position of the user has to be fixed at a pinpoint, which is difficult for practical near-eye display applications. The disclosed near-eye display with pupil shifting and the disclosed method for pupil shifting are directed to solve one or more of the problems set forth above and other problems.

BRIEF SUMMARY OF THE DISCLOSURE

One aspect of the present disclosure provides an optical device. The optical device includes a light source configured to provide a light beam. The optical device includes spatial light modulator ("SLM") configured to modulate the light beam to provide a hologram for generating a display image. The optical device includes a polarization-selective steering assembly configured to provide a plurality of steering angles for the modulated light beam. The optical device includes an image combiner configured to focus the modulated light beam steered by the polarization-selective steering assembly to generate an array of spots at an eye-box of the optical device. The image combiner is a holographic optical element ("HOE") that is angularly selective to an incident light and is multiplexed with a plurality of holograms, such that the optical prescription of the HOE changes as a function of an incidence angle of the incident light. In some embodiments, the multiplexed holograms is angularly selective to incident light angles (i.e., incidence angles of incident lights) that correspond to the steering angles provided by the polarization-selective steering assembly.

Another aspect of the present disclosure provides a method. The method includes determining a position of an eye. The method also includes controlling, based on the position of the eye, a polarization-selective steering assembly to switch to a desired steering state. The method further includes generating a plurality of exit pupils at an eye-box.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

FIG. 6A illustrates a schematic diagram of an LC grating diffracting an incident right-handed circularly polarized light according to an embodiment of the disclosure;

FIG. 6B illustrates a schematic diagram of the LC grating diffracting an incident left-handed circularly polarized light according to an embodiment of the disclosure;

FIG. 10 illustrates polarization track of steering states of the LC steering assembly shown in FIG. 5 according to an embodiment of the disclosure;

DETAILED DESCRIPTION

Figure 1:
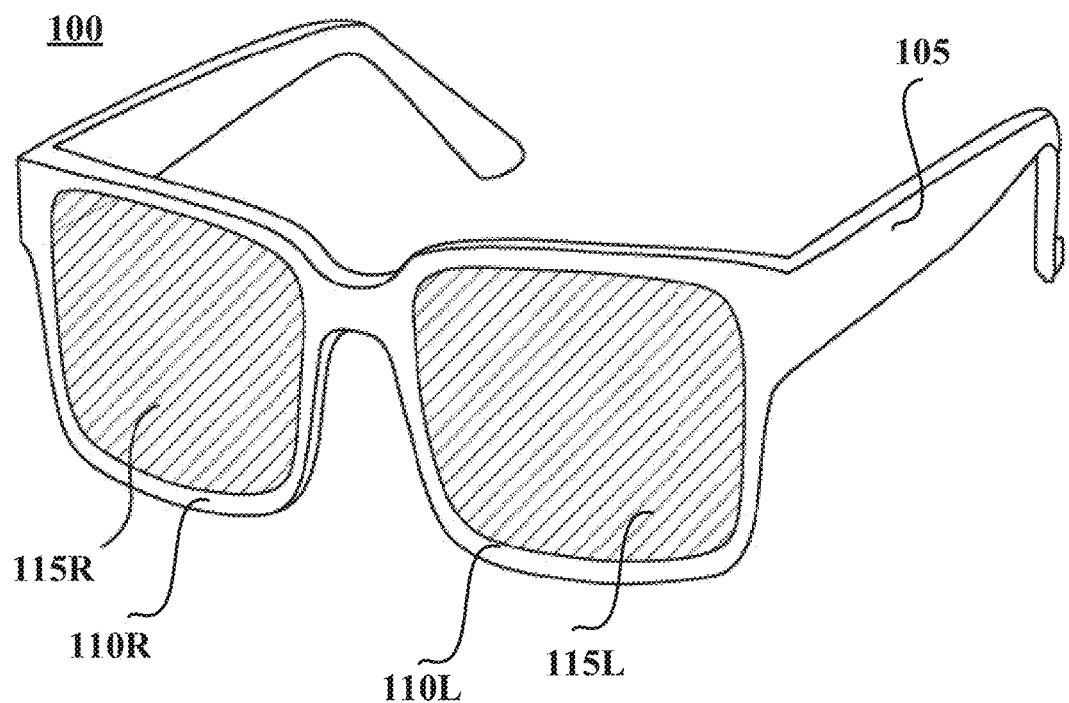
FIG. 1 illustrates a schematic diagram of a near-eye display ("NED") according to an embodiment of the disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides a near-eye display ("NED") having pupil steering. The NED may include a light source configured to provide a light beam, a spatial light modulator ("SLM") configured to modulate the light beam to provide a computer-generated hologram, a polarization-selective steering assembly configured to provide a plurality of steering angles for the modulated light beam, and an image combiner configured to focus the modulated light beam steered by the polarization-selective steering assembly to generate an array of spots at an eye-box of the optical device. One of the plurality of spots may substantially coincide with a position of an eye of a user of the optical device. The NED may also include an eye-tracking device configured to provide eye-tracking information of the eye of the user, based on which the position of the eye of the user is determined. The polarization-selective steering assembly may adjust a steering angle for the modulated light beam based on the eye-tracking information. In some embodiments, the image combiner may be a holographic optical element ("HOE") that is angularly selective to an incident light and is multiplexed with a plurality of holograms, such that the optical prescription of the HOE may change as a function of an incidence angle of the incident light. In some embodiments, the multiplexed holograms may be angularly selective to incident light angles (i.e., incidence angles of incident lights) that correspond to the steering angles provided by the polarization-selective steering assembly. A compact holographic NED system with an expanded eye-box may be realized.

FIG. 1 illustrates a schematic diagram of a near-eye display (NED) 100 according to an embodiment of the disclosure. As shown in FIG. 1, the NED 100 may include a frame 105 configured to rest on a user's head, a right-eye and left-eye holographic display systems 110L and 110R mounted to the frame 105. Each of the right-eye and left-eye holographic display systems 110L, 110R, 115L, and 115R may include image display componentry configured to project computer-generated virtual images into left and right display windows 115R and 115L in the user's field of view (FOV). An exemplary holographic display system representative of the right-eye and left-eye holographic display systems 110L and 110R will be described in more detail below with reference to FIGS. 2-3.

The NED 100 may function as a virtual reality ("VR") device, an augmented reality ("AR") device, a mixed reality ("MR") device, or any combination thereof. In some embodiments, when the NED 100 functions as an AR or a MR device, the right and left display windows 115R and 115L may be entirely or partially transparent from the perspective of the user, to give the user a view of a surrounding real-world environment. In some embodiments, when the NED 100 functions as a VR device, the right and left display windows 115R and 115L may be opaque, such that the user may be completely absorbed in the VR imagery provided via the NED. In some embodiments, the NED 100 may further include a dimming element, which may dynamically adjust the transmittance of real-world objects viewed through the right and left display windows 115R and 115L, thereby switching the NED 100 between a VR device and an AR device or between a VR device and a MR device. In some embodiments, along with switching between the AR/MR device and the VR device, the dimming element may be used in the AR device to mitigate difference in brightness of real and virtual objects.

Figure 2:
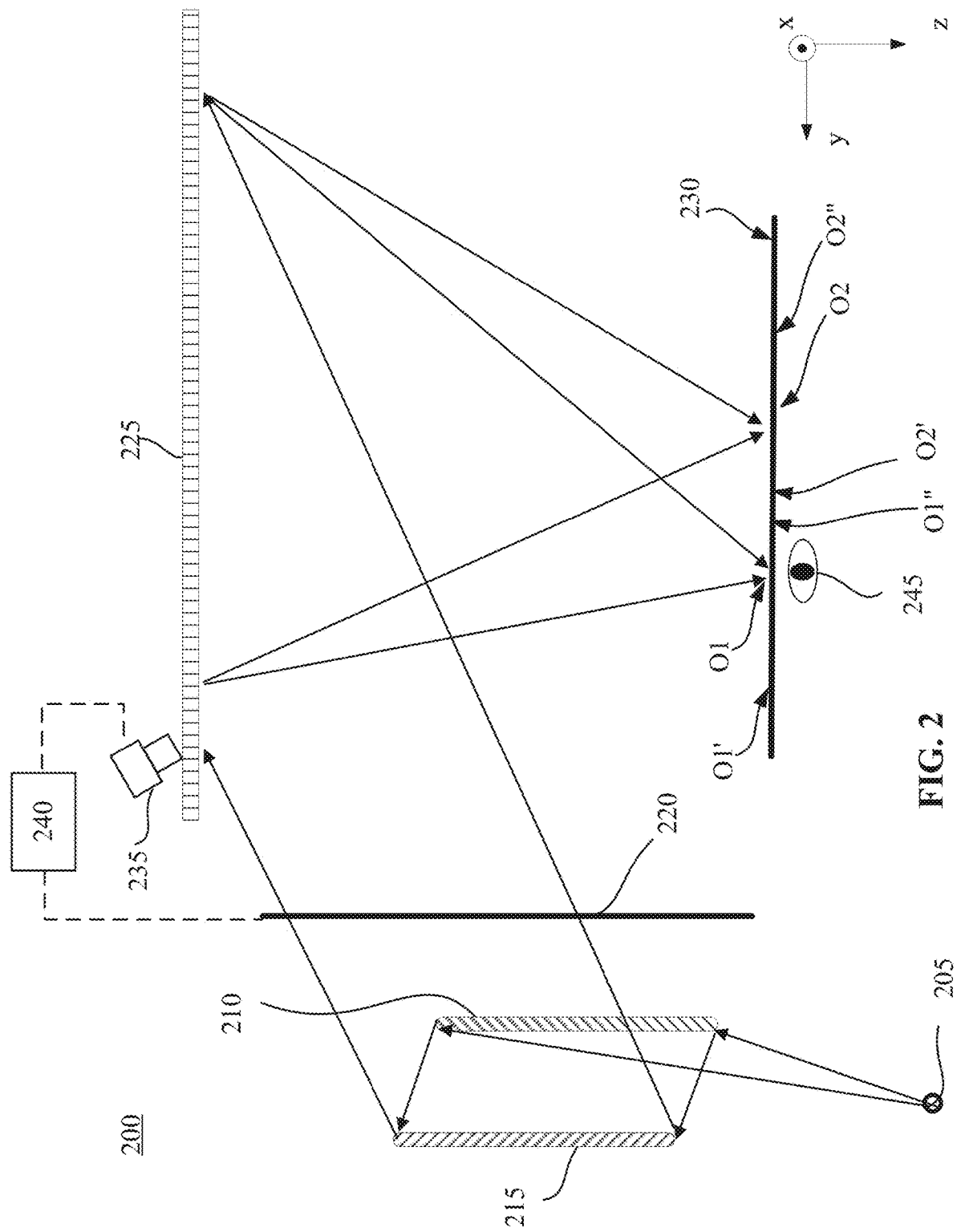
FIG. 2 illustrates a schematic diagram of a holographic display system of the NED shown in FIG. 1 according to an embodiment of the disclosure.
Figure 3:
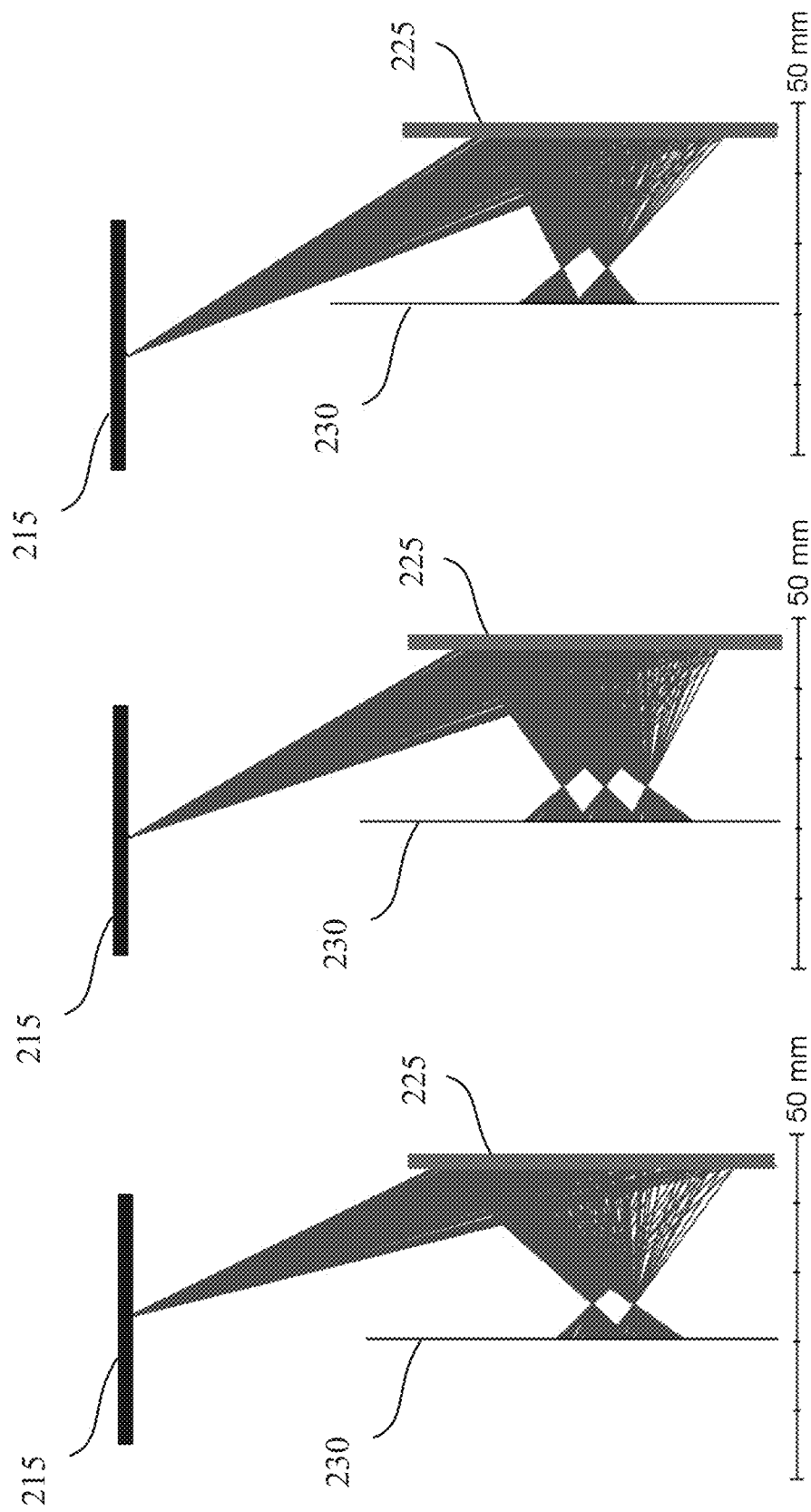
FIGS. 3A-3C illustrate schematic diagrams of holographic optical element ("HOE") image combiner according to embodiments of the disclosure.

FIG. 2 illustrates a schematic diagram of a holographic display system 200 of the NED 100 in FIG. 1 according to an embodiment of the disclosure. As shown in FIG. 2, the holographic display system 200 may include a light source 205, a front light holographic optical element ("HOE") 210, a spatial light modulator ("SLM") 215, a liquid crystal ("LC") steering assembly 220, an image combiner 225, an eye-tracking device 235, and a controller 240. The controller 240 may be electrically coupled with one or more of the other devices, such as the eye-tracking device 235 and the polarization-selective steering assembly 220. The holographic display system 200 may include other elements, which are not limited by the present disclosure.

The light source 205 may include a point light source configured to generate coherent or partially coherent light that is converging or diverging. The light source 205 may include, e.g., a laser diode, a fiber laser, a vertical cavity surface emitting laser, and/or a light emitting diode. In some embodiments, the light source 205 may be a component included in the NED 100. In some embodiments, the light source 205 may be part of some other NED or other system that generates coherent or partially coherent light. In some embodiments, the NED 100 may further include one or more optical components that condition the light generated by the light source 205. Conditioning light from the light source 205 may include, e.g., polarizing, and/or adjusting orientation in accordance with instructions from a controller of the light source 205. In some embodiments, the light source 205 may include a single optical fiber that is coupled to three laser diodes emitting red, green and blue light, respectively, for example, having a central wavelength of about 448 nm, 524 nm, and 638 nm, respectively. The laser light may be linearly polarized to match the requirement of the SLM 215.

The front light HOE 210 may be located between the light path of the light source 205 and the SLM 215. The front light HOE 210 may be configured to direct (e.g., reflect) the light beam received from the light source 205 to illuminate the downstream SLM 215, such that the optical path may be folded. In addition, the size of the front light HOE 210 and the light source 205 may be made sufficiently small to achieve a compact form factor. The light beam directed by the front light HOE 210 may cover an entire active area of the SLM 215. In some embodiments, the front light HOE 210 may be configured to further expand the light beam received from the light source 205, such that the expanded light beam may cover an entire active area of the SLM 215. In some embodiments, the front light HOE 210 may consist of a fixed hologram that expands the light beam received from the light source 205 and directs the light beam to the downstream SLM 215, such that the expanded light beam may cover an entire active area of the SLM 215. In some embodiments, the front light HOE 210 may be angularly selective so that the front light HOE 210 substantially deflects light originating directly from light source 205 but does not substantially deflect light from other angles (i.e., light that has deflected off the SLM 215). In some embodiments, the front light HOE 210 may be multiplexed so that the front light HOE 210 has high diffraction efficiency at multiple wavelengths, e.g. those at red, green, and blue light spectrum respectively. In some embodiments, the red, green, and blue light may be centered at 448 nm, 524 nm, and 638 nm respectively.

The SLM 215 may be located between the light path of the light source 205 and the polarization-selective steering assembly 220, and configured to modulate the light beam, for example, the amplitude, phase, and/or the polarization of the light beam in space and/or time, to provide a computer-generated hologram for generating a display image. Any suitable SLM 215 may be used. For example, the SLM 215 may include an LC material. In some embodiments, the SLM 215 may include a translucent or reflective LC microdisplay. In some embodiments, the SLM 215 may include a vertical aligned nematic, parallel aligned nematic, or twisted nematic microdisplay cell. In some embodiments, the SLM 215 may be electrically programmed to modulate the light beam based on a fixed spatial ("pixel") pattern.

The modulated light beam (i.e., the hologram generated by the SLM 215) may be incident onto the polarization-selective steering assembly 220, which is configured to steer the incident lights of different polarizations to different steering angles. In some embodiments, the polarization-selective steering assembly 220 may provide a plurality of steering states for an incident light beam in accordance with instructions from the controller 240. The plurality of steering states may result in a plurality of steering angles of the incident light beam. In some embodiments, the polarization-selective steering assembly 220 may be electrically switchable among the plurality of steering states. In some embodiments, the polarization-selective steering assembly 220 may include a metasurface steering element. Metasurface can be designed as a transmissive, polarization-selective beam steering component with high efficiency and high transparency. The polarization selectivity may be linear or circular. In some embodiments, the polarization-selective steering assembly 220 may include a liquid crystal ("LC") steering element. In some embodiments, the polarization-selective steering assembly 220 may include a stack of two LC steering elements each steers a light team in a different axis, such that the stack of two LC steering elements may steer the light beam over two axes. Examples of LC steering element may include an optical phased array (OSA), a switchable Bragg grating, an index matched surface relief grating, a Pancharatnam-Berry Phase ("PBP") grating, etc. For discussion purposes, a PBP grating will be used as an example of the LC steering element, and the polarization-selective steering assembly 220 is referred to as a PBP grating assembly. The details of the PBP grating assembly will be described in FIG. 5.

The image combiner 225 may be configured to simultaneously focus the light beam steered by polarization-selective steering assembly 220 to an array of spots at a surface where an exit pupil of the NED 100 is located. An exit pupil may be a location where an eye pupil 245 of a user is positioned in an eye-box region when the user wears the NED 100. That is, a plurality of exit pupils may be simultaneously available at the eye-box 230 of the NED 100. When used for AR applications, the image combiner 225 may combine the light beam steered by the polarization-selective steering assembly 220 and a light beam from a real-world environment (not shown in FIG. 2), and direct both light beams towards the eye-box 230 of the NED 100.

The plurality of exit pupils simultaneously provided by the image combiner 225 may be configured to space apart, and one of the plurality of exit pupils may substantially coincide with a position of the eye pupil 245. That is, one of the spots may be directed into the eye pupil 245, such that the user may observe the display image generated by the SLM 215 that is optically combined with a real-world scene when the NED is used for AR applications. The plurality of exit pupils provided by the image combiner 225 may be configured to sufficiently space apart from each other, such that when one of the exit pupils provided by the image combiner 225 substantially coincides with the position of the eye pupil 245 (i.e., one of the spots falls onto the user's eye pupil 245), the rest of the exit pupils may be located beyond the position of the eye pupil 245 (i.e., the rest of the spots may fall outside the eye 245).

For example, the image combiner 225 may direct (e.g., focus) the light beam steered by the polarization-selective steering assembly 220 to an array of M spots at the surface where the exit pupil of the NED 100 is located (M being a positive integer). The polarization-selective steering assembly 220 may provide N steering angles or steering states (N being a positive integer). Therefore, the polarization-selective steering assembly 220 and the image combiner 225 together may provide a maximum number of N*M exit pupils at the surface where the exit pupil of the NED 100 is located. At any instance, M of the N*M spots may be available for being selected into the eye pupil 245. Depending on the position of the eye pupil 245, one of the M spots may be directed into the eye pupil 245, such that the user may observe the display image generated by the SLM 215 that is optically combined with the real-world scene when the NED 100 is used for AR applications. The array of M spots may comprise a 1D or 2D pattern in the eye-box. In some embodiments, the depth of the spots (i.e. the distance between the image combiner 225 and the spot) may be varied among the array of spots. In some embodiments, the depth of the spots in the array may be varied so that it matches the depth of the pupil when the eye rotates around a nominal position. That is, a depth of the array of spots may be patterned to account for eye rotation around a nominal position.

In some embodiments, the image combiner 225 may include a HOE that has a wide FOV, and the image combiner 225 is also referred to as a HOE image combiner. The HOE may include a fixed hologram that focuses light from a highly off-axis light beam (e.g., steered light beam) into an on-axis light beam in front of the eye pupil 245. In some embodiments, the HOE may include a volume (or Bragg) hologram, and may function only over a narrow set of angles and wavelengths, thereby redirecting and focusing the light beam received from the SLM 215 and, meanwhile, providing a clear, highly transparent see-through view to the user. The HOE may be multiplexed to have high diffraction efficiency at a plurality of wavelengths, (e.g., red, green and blue wavelengths), thereby enabling a full color display.

FIGS. 3A-3C illustrate schematic diagrams of HOE image combiners 225 according to embodiments of the disclosure. FIGS. 3A-3C illustrate a portion of the holographic display system 200 in FIG. 2. Similar to FIG. 2, reference numbers 220, 230 and 225 in FIGS. 3A-3C also denote the polarization-selective steering assembly, the eye-box and the HOE image combiner, respectively. In some embodiments, the HOE image combiner 225 may be angularly selective to an incident light and may be multiplexed with a plurality of holograms, such that the optical prescription of the HOE image combiner 225 may change as a function of an incidence angle of the incident light. In some embodiments, the multiplexed holograms may be angularly selective to incident light angles (i.e., incidence angle of the incident light) that correspond to the steering angles provided by the polarization-selective steering assembly 220, as FIG. 3A and FIG. 3C show. In some embodiments, the optical prescriptions for each multiplexed hologram may be designed to correct optical aberrations (e.g. pupil aberrations) for each of the steering states of the polarization-selective steering assembly 220. In some embodiments, the number and/or positions of the M spots may vary with each multiplexed hologram, as FIG. 3A and FIG. 3B show. In some embodiments, the depths of the M spots may vary in depth among the multiplexed holograms. In some embodiments, the variation in depth among the M spots may be matched to the variation in eye relief among users.

Returning to FIG. 2, the eye-tracking device 235 may provide eye-tracking information, based on which the position of the eye pupil 245 may be determined and, accordingly, the steering state of the polarization-selective steering assembly 220 may be determined. Any suitable eye-tracking device 235 may be used. The eye-tracking device 235 may include, e.g., one or more sources that illuminate one or both eyes of the user, and one or more cameras that capture images of one or both eyes of the user. The eye-tracking device 235 may be configured to track a position, a movement, and/or a viewing direction of the eye pupil 245 of the user. In some embodiments, the eye-tracking device 235 may measure the eye position and/or eye movement up to six degrees of freedom of each eye (i.e., 3D position, roll, pitch, and yaw). In some embodiments, the eye-tracking device 235 may measure pupil size. The eye-tracking device 235 may provide a signal (feedback) to the controller 240 regarding the position and/or movement of the eye pupil 245.

Based on the eye-tracking information provided by the eye-tracking device 235, the controller 240 may be configured to control the polarization-selective steering assembly 220 to adjust the steering angle of the light beam, thereby changing the positions of the exit pupils available at the eye-box 230. One of the exit pupils available at the eye-box 230 may substantially coincide with the position of the eye pupil 245 and fall onto the eye pupil 245, such that the light beam focused by the image combiner 225 may be directed into the eye pupil 245. Thus, the polarization-selective steering assembly 220 and the image combiner 225 together may shift the exit pupil of the system to cover an expanded eye-box area based on the eye-tracking information provided by the eye-tracking device 235. A compact holographic NED system with an expanded eye-box may be realized.

For illustration purposes, in FIG. 2, M is assumed to be 2. As shown in FIG. 2, two exit pupils ("two spots") O1 and O2 may be simultaneously available for being selected to direct the light beam into the eye pupil 245. Depending on the position of the eye pupil 245, one ("e.g., O1") of the spots O1 and O2 may be selected to fall onto the eye pupil 245, such that the light beam focused by the image combiner 225 may be directed into the eye pupil 245. At the instance shown in FIG. 2, the two available exit pupils are O1 and O2. At another instance, the polarization-selective steering assembly 220 may be controlled by the controller 240 such that two available exit pupils may be O1' and O2'. That is, the available exit pupils may be shifted to the left from the initial positions at O1 and O2. At yet another instance, the polarization-selective steering assembly 220 may be controlled by the controller 240 such that two available exit pupils may be O1" and O2". In other words, the available exit pupils may be shifted to the right from the initial positions at O1 and O2.

In the disclosed embodiments, the light beam emitted from the light source 205 may be deflected by the front light HOE 210 to illuminate the SLM 215, such that the light path may be folded by the front light HOE 210. The size of the front light HOE 210 and the light source 205 may be made sufficiently small to achieve a compact form factor. The PBP grating assembly 500 may be configured to provide a plurality of steering states for the modulated light beam received from the SLM 215. The PBP grating assembly 500 may be compact with a thickness of several millimeters to reduce the form factor of the NED 100. In addition, through using SHWPs having a fast switching speed, for example, on an order of milliseconds, the switching speed of the PBP grating assembly 500 when switching between different steering states may be sufficiently fast to keep pace with the movement of the eye pupil 245, such that real-time eye tracking and real-time shifting of the exit pupil positions may be realized.

The HOE image combiner 225 may be configured to simultaneously focus the light beam steered by the PBP grating assembly 500 to a plurality of exit pupils available at the eye-box 230 of the NED 100, such that the number of the steering states provided by the PBP grating assembly 500 may be reduced, thereby further reducing the thickness of the PBP grating assembly 500. In addition, each of the plurality of exit pupils simultaneously generated by the HOE image combiner 225 may be corrected for aberration during the exposure of the HOE, such that the exit pupil aberration may be minimized, and/or the image quality of the NED 100 may be improved.

Figure 4:
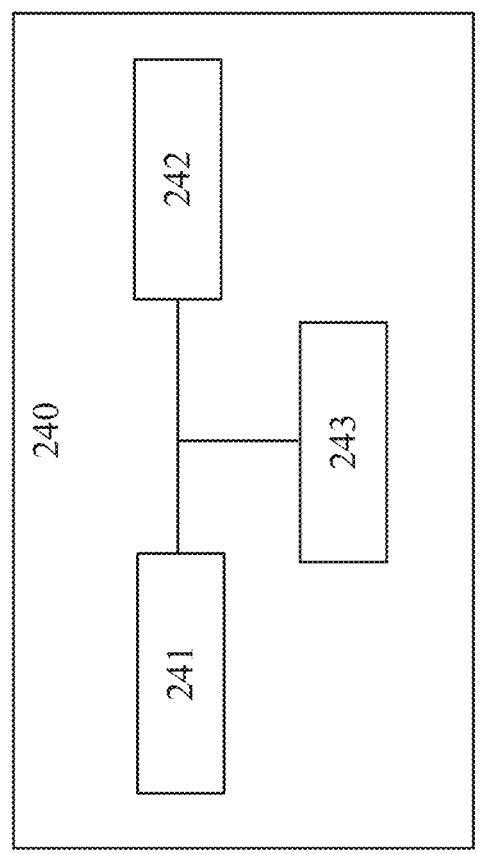
FIG. 4 illustrates a schematic diagram of a controller included in the NED shown in FIG. 1 according to an embodiment of the disclosure.

FIG. 4 is a schematic diagram of the controller 240. The controller 240 may include a processor 241, a storage device 242, and an input/output interface 243. The processor 241 may include any suitable processor, such as a central processing unit, a microprocessor, an application-specific integrated circuit, a programmable logic device, a complex programmable logic device, a field-programmable gate array, etc. The processor 241 may be specially programmed to control the PBP grating assembly 500 to adjust a steering angle of the light beam passing through the PBP grating assembly 500 based on the feedback (e.g., eye position information) provided by the eye-tracking device 235. In other words, the processor 241 may be configured to change the locations of the plurality of exit pupils (e.g., M exit pupils) simultaneously available at the eye-box 230 based on the position and/or movement of the eye, as provided by the eye-tracking device 235. The locations of the plurality of exit pupils may be shifted such that at any instance, a suitable one of the plurality of exit pupils may fall onto the eye pupil 245.

The storage device 242 may be configured to store data, signal, information, or computer-readable codes or instructions. The storage device 242 may include a non-transitory computer-readable storage medium, such as a magnetic disk, an optical disk, a flash memory, a read-only memory ("ROM"), or a random-access memory ("RAM"), etc. The processor 241 may access the storage device 242 and retrieve data or instructions from the storage device 242. In some embodiments, the storage device 242 may store feedback data provided by the eye-tracking device 235. The processor 241 may retrieve the feedback data provided by the eye-tracking device 235 for analysis. In some embodiments, the storage device 242 may store the steering states of the PBP grating assembly 500, and the processor 241 may retrieve the current steering states when determining a next steering state for the PBP steering state 220.

The input/output interface 243 may be any suitable data or signal interface. The input/output interface 243 may be an interface configured for wired or wireless communication.

In some embodiments, the input/output interface 243 may include a transceiver configured to receive and transmit signals. In some embodiments, the input/output interface 243 may be configured to communicate with the eye-tracking device 235 and the PBP grating assembly 500, and may receive data or signal (or transmit data or signal) from (or to) the eye-tracking device 235 and the PBP grating assembly 500.

Figure 5:
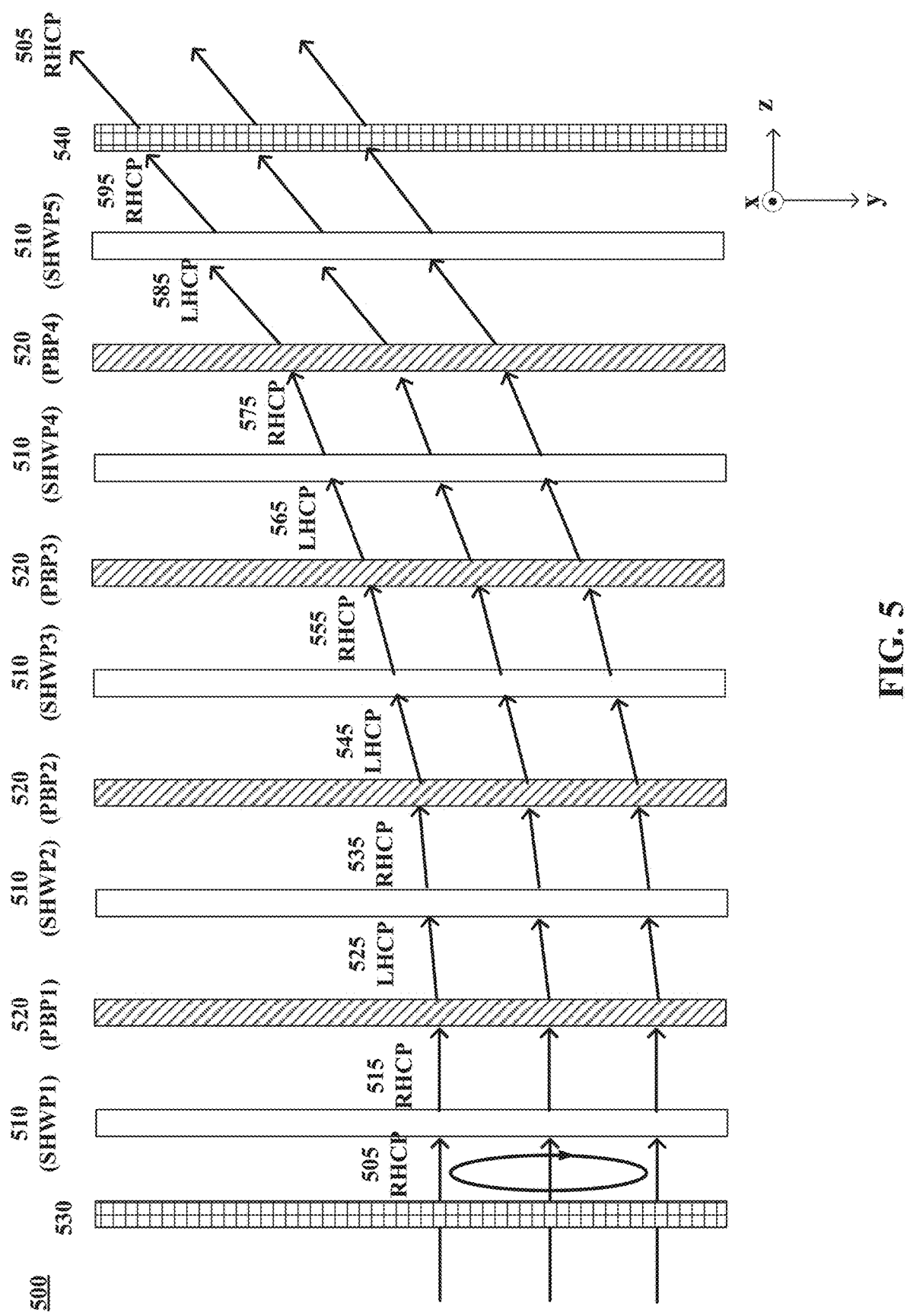
FIG. 5 illustrates a schematic diagram of a liquid crystal ("LC") steering assembly according to an embodiment of the disclosure.

FIG. 5 illustrates a schematic diagram of a PBP grating assembly 500 according to an embodiment of the disclosure. The PBP grating assembly 500 may be an embodiment of the polarization-selective steering assembly 220 shown in FIG. 2. As shown in FIG. 5, the PBP grating assembly 500 may include a plurality of PBP LC gratings 520 and a plurality of switchable half-wave plates ("SHWP") 510. The PBP LC gratings 520 and the SHWPs 510 may be alternately arranged. The SHWP 510 may be a half-wave plate that transmits a polarized light of a specific handedness in accordance with a switching state of the SHWP 510. In some embodiments, the SHWP 510 may include an LC layer, and the switching of the SHWP 510 may be realized by applying or removing a voltage to the LC layer. The PBP LC grating 520 may diffract circularly polarized light by a certain angle according to the handedness of circularly polarized incident light. For illustrative purposes, FIG. 5 shows that the PBP grating assembly 500 may include four SHWPs 510 that are SHWP1 to SHWP 5, and four PBP LC gratings 520 that are PBP1 to PBP 5.

FIG. 6A illustrates a schematic diagram of a PBP LC grating 600 that diffracts an incident right-handed circularly polarized ("RHCP") light to a positive angle according to an embodiment of the disclosure, and FIG. 6B illustrates a schematic diagram of the PBP LC grating 600 that diffracts an incident left-handed circularly polarized ("LHCP") light to a negative angle, according to an embodiment of the disclosure. The PBP LC grating 600 may be an embodiment of the PBP LC gratings 520 shown in FIG. 5. As shown in FIGS. 6A-6B, the PBP LC grating 600 may diffract circularly polarized light by an angle expressed by the following Equation (1):

$$\theta = \sin^{-1}\left(\frac{\lambda}{\Lambda}\right), \quad (1)$$

where $\lambda$ is the wavelength of the incident light, and $\Lambda$ is the pitch of the PBP LC grating 600.

Figure 7A:
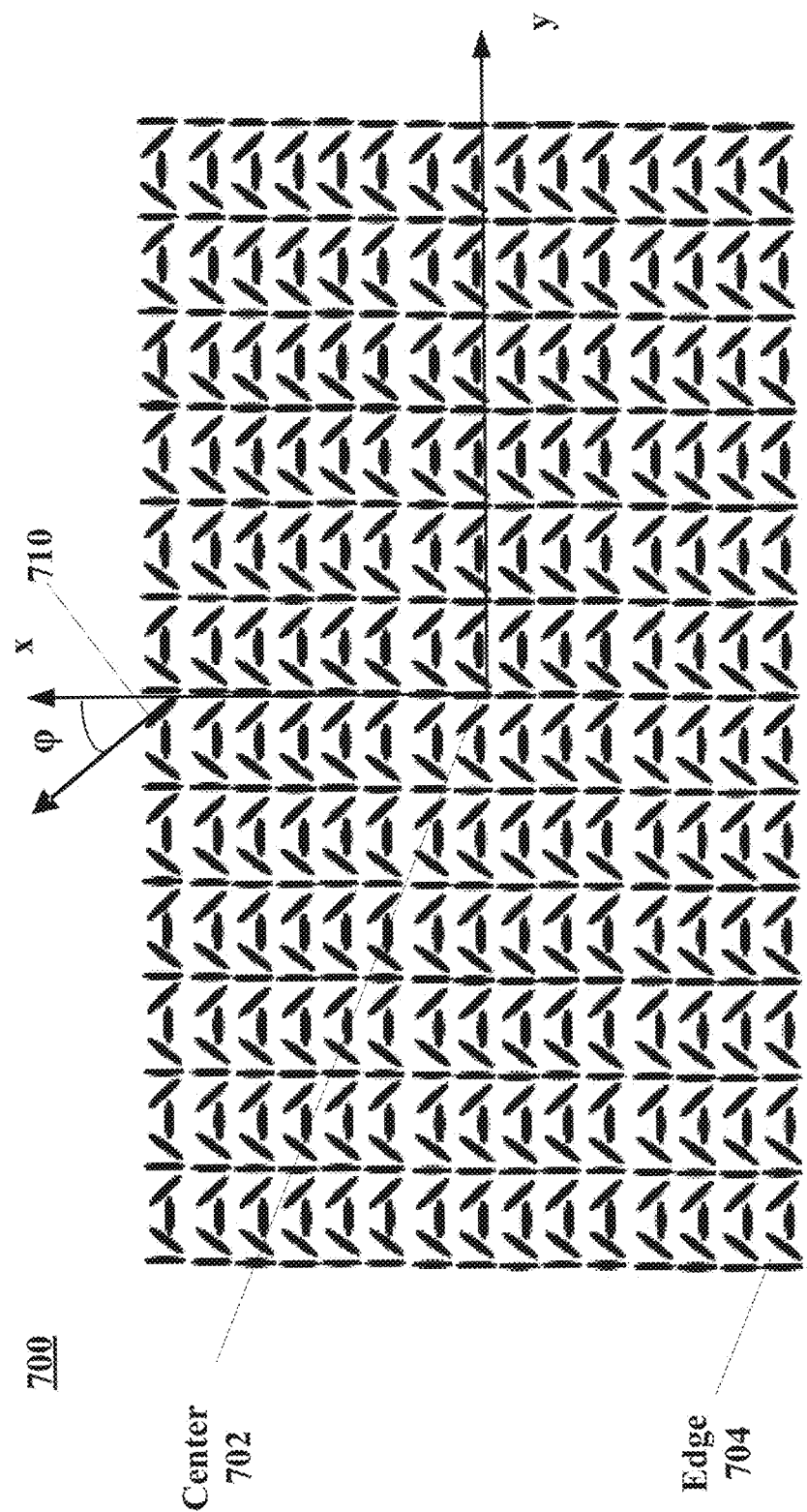
FIG. 7A illustrates a schematic diagram of LC orientations in the LC grating shown in FIG. 6 according to an embodiment of the disclosure.
Figure 7B:
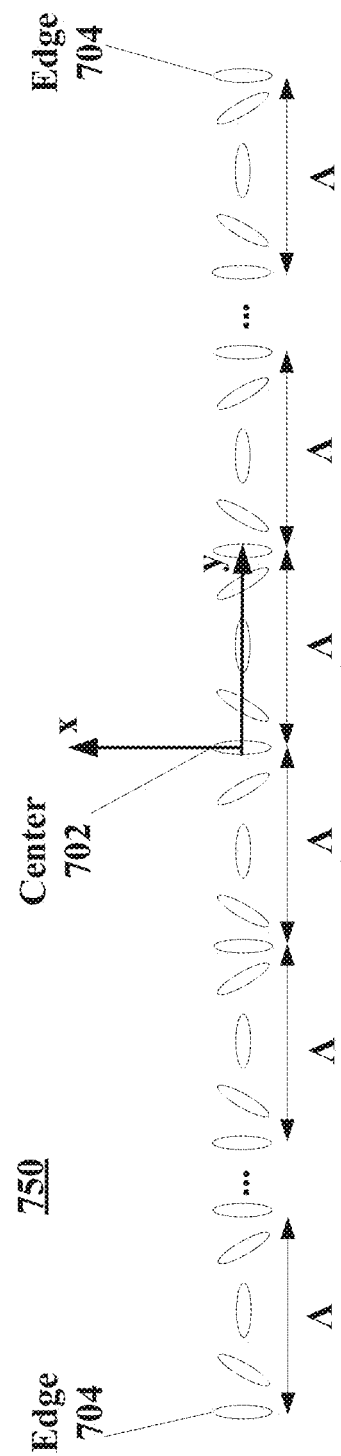
FIG. 7B illustrates a portion of the LC orientations in the LC grating in FIG. 6 according to an embodiment of the disclosure.

FIG. 7A illustrates LC orientations 700 in the PBP LC grating 600 shown in FIG. 5, and FIG. 7B illustrates a section of LC orientations 750 taken along a y-axis in the PBP LC grating 600 shown in FIG. 5. As shown in FIGS. 7A-7B, the azimuth angles ($\varphi$) of an LC molecule 710 may be changed in a linearly repetitive pattern from a center 702 to an edge 704 of the PBP LC grating 600, with a uniform pitch $\Lambda$. The pitch $\Lambda$ of the PBP LC grating 600 may be half the distance along the y-axis between repeated portions of the pattern. The pitch $\Lambda$ may determine, in part, the optical properties of the PBP LC grating 600. For example, the pitch $\Lambda$ may determine the diffraction angles (e.g., light beam-steering angles) of the light as shown in Eq. (1). Generally, the smaller the pitch $\Lambda$, the larger the diffraction angle for a given designed wavelength.

In some embodiments, the PBP LC grating 600 may be passive (also referred to as a passive element). A passive PBP LC grating may have two optical states: a positive state and a negative state. In some embodiments, in the positive state, the passive PBP LC grating may diffract light at a particular wavelength to a positive angle (e.g., +θ), i.e., an angle that is positive relative to the diffraction angle of the negative state. In the negative state, the passive PBP LC grating may diffract light at the particular wavelength to a negative angle (e.g., −θ), i.e., an angle that is negative relative to the diffraction angle of the positive state. The optical state of a passive PBP LC grating may be determined by the handedness of circularly polarized light incident on the passive PBP LC grating. In some embodiments, referring to FIGS. 6A-6B, a passive PBP LC grating 600 may operate in a positive state in response to a RHCP light, and operate in a negative state in response to a LHCP light. Such a PBP LC grating may also be referred to as a right-handed PBP LC grating. Further, a passive PBP LC grating may reverse the handedness of circularly polarized light transmitted through the passive PBP LC grating in addition to diffracting the light. For example, RHCP (LHCP) input light may be converted to LHCP (RHCP) output light after passing through a passive PBP LC grating.

In some embodiments, the PBP LC grating 600 may be active (also referred to as an active element). An active PBP LC grating may have three optical states: a positive state, a neutral state, and a negative state. In some embodiments, in the positive state and the negative state, the active PBP LC grating may diffract light at a particular wavelength to a positive angle (e.g., +θ) and a negative angle (e.g., −θ), respectively. When not in the neutral state, the active PBP LC grating may output light that has a handedness opposite that of the light input into the active PBP LC grating. In the neutral state, the active PBP LC grating may not diffract light, but may or may not affect the polarization of light transmitted through the active PBP LC grating. The state of an active PBP LC grating may be determined by a handedness of circularly polarized light incident onto the active PBP LC grating and an applied voltage. In some embodiments, an active PBP LC grating may operate in an positive state in response to a RHCP light and an applied voltage of zero (or more generally below some predetermined minimal value), operate in a negative state in response to a LHCP light and the applied voltage of zero (or more generally below some predetermined minimal value), and operate in a neutral state (regardless of polarization) in response to an applied voltage larger than a threshold voltage that aligns LCs along with the electric field.

Figure 8B:
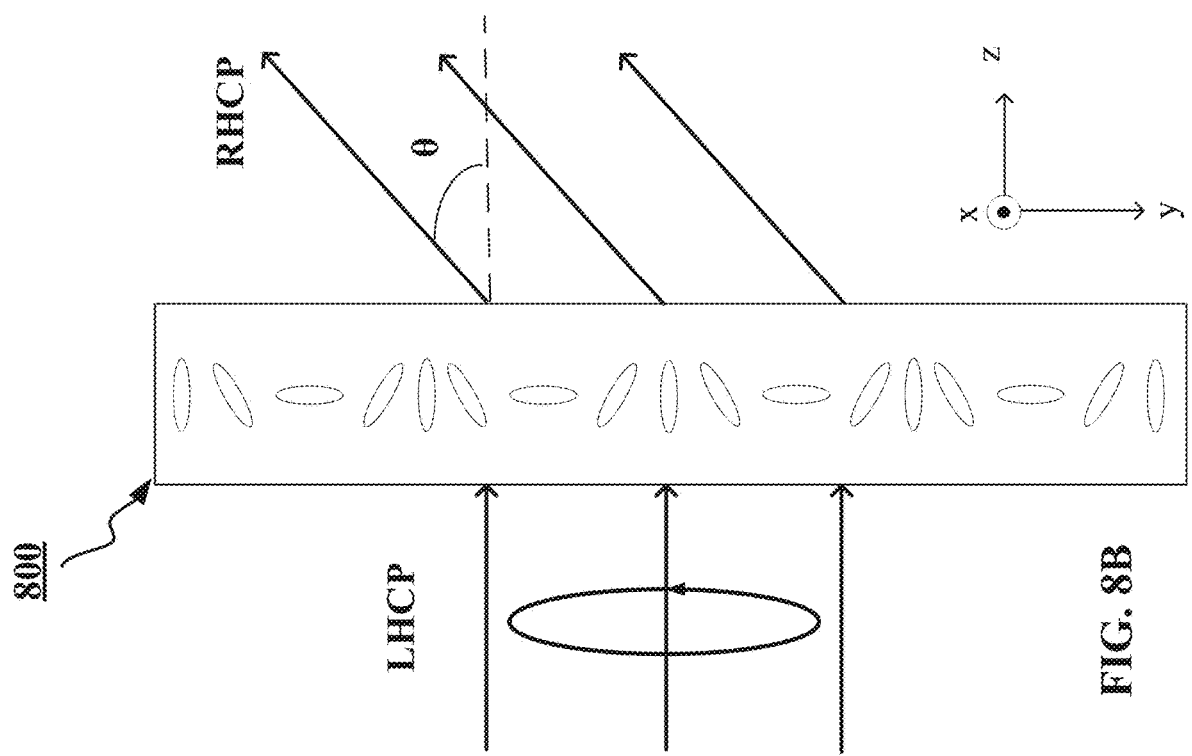
FIG. 8B illustrates a schematic diagram of a flipped LC grating diffracting an incident left-handed circularly polarized light according to an embodiment of the disclosure.
Figure 8A:
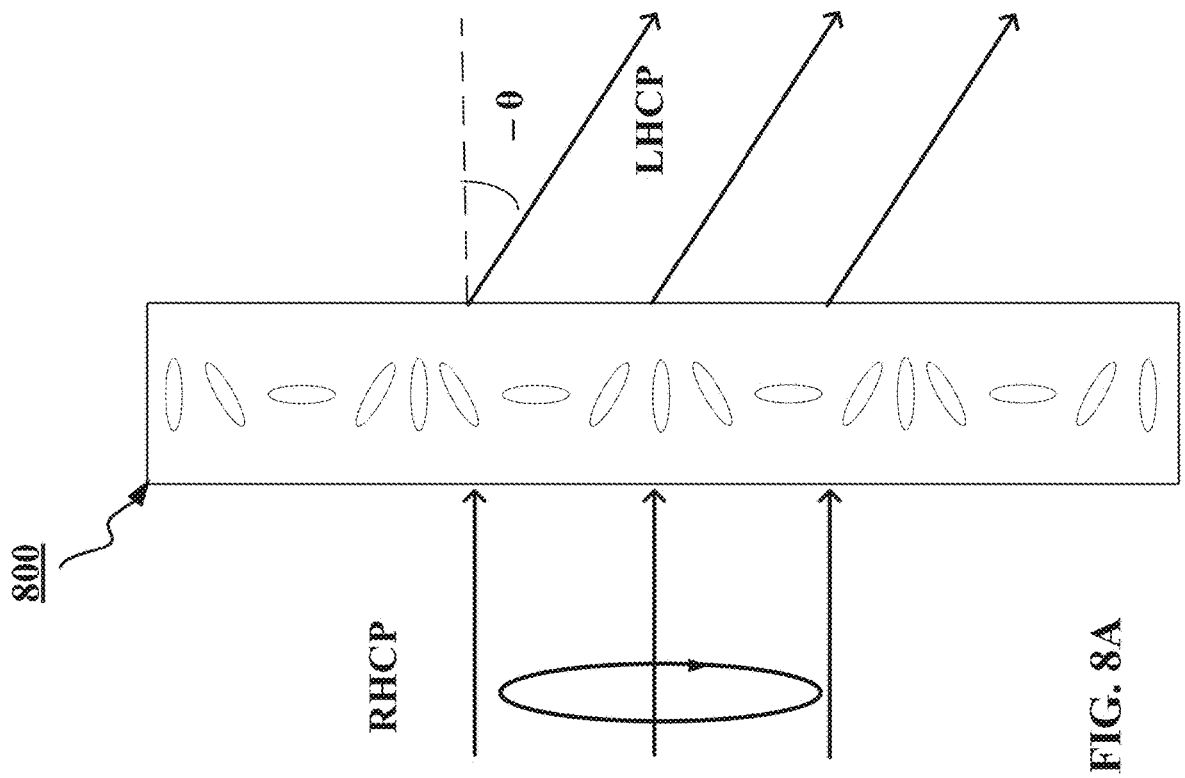
FIG. 8A illustrates a schematic diagram of a flipped LC grating diffracting an incident right-handed circularly polarized light according to an embodiment of the disclosure.

Further, through flipping a PBP LC grating, the positive state and the negative state of the PBP LC grating may be reversed for the circularly polarized incident light with the same handedness. As shown in FIG. 8A and FIG. 8B, a PBP LC grating 800 may be the PBP LC grating 600 shown in FIGS. 6A-6B after being flipped, respectively. When the PBP LC grating 800 is a passive PBP LC grating, the PBP LC grating 800 may operate in a negative state that diffracts light at the particular wavelength to a negative angle (e.g., −θ) in response to a RHCP light, and operate in an positive state that diffracts light at a particular wavelength to a positive angle (e.g., +θ) in response to a LHCP light. Such a PBP LC grating 800 may also be referred to as a left-handed PBP LC grating.

PBP LC gratings may have strong chromatic aberration. The chromatic aberration has two main reasons. The first one is that the thickness of a PBP LC grating is often designed to be a half-wave for a design wavelength. Thus, for example, when a PBP LC grating is designed for a green wavelength, the thickness of the PBP LC grating may be no longer a half-wave for a blue wavelength or a red wavelength, and part of the incident light may diffract to $0^{th}$ order, which causes loss in diffraction efficiency (light leakage) when illuminating a PBP LC grating with light of a non-design wavelength. In view of this, a twist structure may be introduced along the thickness direction of a PBP LC grating and compensated for by its mirror twist structure, which enables the PBP LC grating to have achromatic performance. For example, the diffraction efficiency of the light may be substantially the same for all wavelength.

Figure 9A:
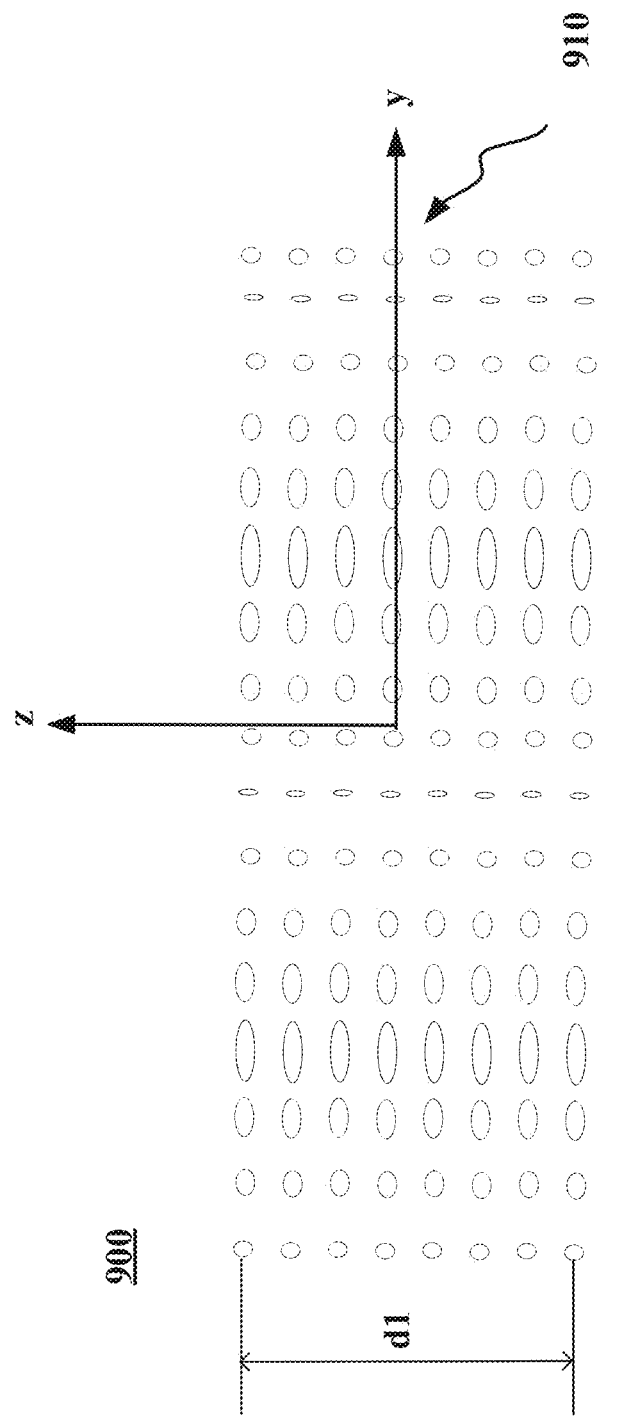
FIG. 9A illustrates LC orientations of an LC grating without a twist structure according to an embodiment of the disclosure.

FIG. 9A illustrates a PBP LC grating 900 without a twist structure according to an embodiment of the present disclosure. As shown in FIG. 9A, in an LC layer 910 of the PBP LC grating 900, along a y-axis, the azimuth angles (φ) of LC molecules may be changed in a linearly repetitive pattern from a center to an edge of the PBP LC grating 900. Along a z-axis, the directors or the azimuth angles (φ) of an LC molecule may remain the same from the bottom to the top of the LC layer 910. The thickness $d_1$ of the LC layer 910 may be configured as $d_1=\lambda/(2*\Delta n)$, where $\lambda$ is a design wavelength, and $\Delta n$ is the birefringence of the LC materials of the LC layer 910.

Figure 9B:
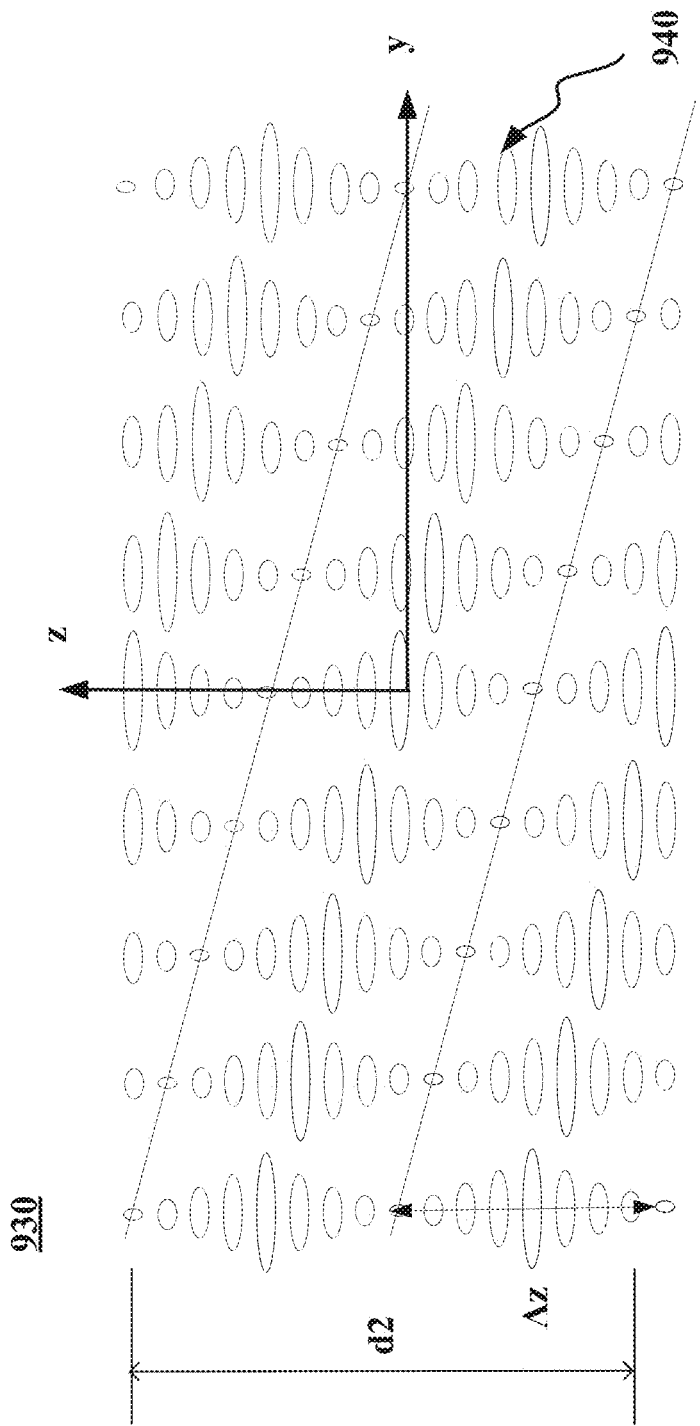
FIG. 9B illustrates LC orientations of an LC grating having a dual-twist structure according to an embodiment of the disclosure.

FIG. 9B illustrates a PBP LC grating 930 having a twist structure according to an embodiment of the present disclosure. As shown in FIG. 9B, in an LC layer 940 of the PBP LC grating 930 having a dual-twist structure, the directors of the LC molecules along the y-axis may be the same as a non-twisted PBP LC grating shown in FIG. 9A, while along z-axis the directors of the LC molecules may twist to a certain degree from the bottom to half way across the LC layer 940, then twist back through the top. That is, the vertical pitch $\Lambda z$ may be half the thickness of the LC layer 940. The thickness $d_2$ of the LC layer 940 may be configured as $d_2=2*\lambda/(2*\Delta n)$, where $\lambda$ is a design wavelength, and $\Delta n$ is the birefringence of the LC materials of the LC layer 940. The PBP LC grating having a double-twist structure may have an improved light leakage as compared to the PBP LC grating without a twist structure.

Figure 9C:
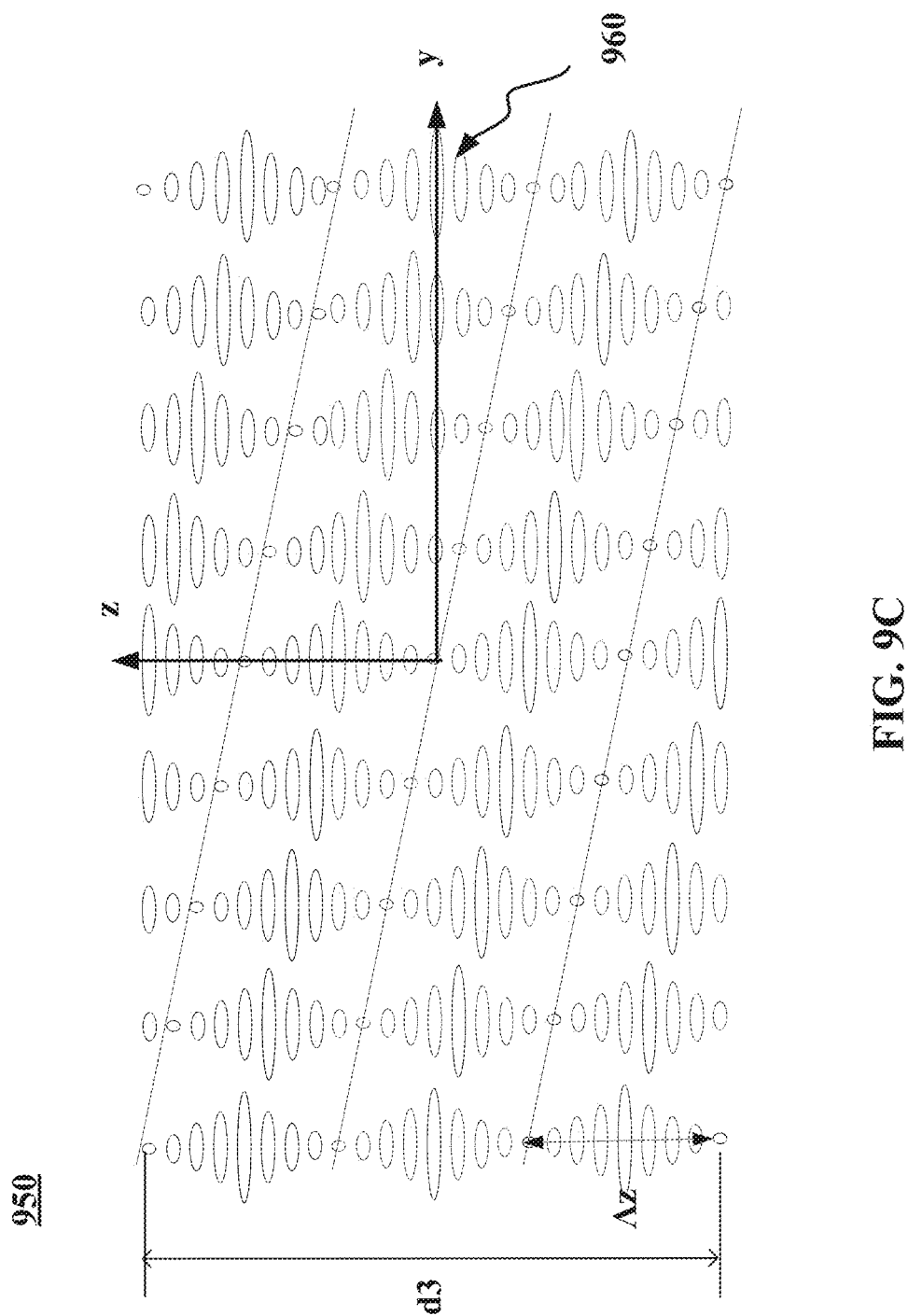
FIG. 9C illustrates LC orientations of an LC grating having a super-twist structure according to an embodiment of the disclosure.

For illustrative purposes, FIG. 9B illustrates the PBP LC grating 930 having a dual-twist structure. In some embodiments, the PBP LC grating may have a multiple-twist structure (which is also referred to as a "super-twist structure"), for example, the vertical pitch $\Lambda z$ may be one third of the thickness of the LC layer, as a PBP LC grating 950 in FIG. 9C shows. The thickness $d_3$ of an LC layer 960 of the PBP LC grating 950 may be configured as $d_3=3*\lambda/(2*\Delta n)$, where $\lambda$ is a design wavelength, and $\Delta n$ is the birefringence of the LC materials of the LC layer 960. The PBP LC grating having a super-twist structure may have further improved light leakage as compared to the PBP LC grating having a double-twist structure.

The second reason for the chromatic aberration of the PBP LC gratings is that a steering angle of the PBP LC grating as shown in Eq. (1) is dependent on wavelength and, thus, the steering angle may be different for each wavelength. One approach is to use three PBP LC gratings and two color-selective filters, where the two color-selective filters and the three PBP LC gratings may be alternately arranged. The color selective filter may rotate the polarization of one wavelength (e.g., green), but pass the other two wavelengths (e.g., red and blue) without any change their polarization. In other words, the color selective filter may be a half-wave plate for one wavelength but a one-wave plate for the other two wavelengths.

Referring to FIG. 5, FIG. 6A, and FIG. 6B, the PBP grating assembly 500 may control the handedness of a circularly polarized light incident onto a PBP LC grating 520 in accordance with a switching state of a SHWP 510. The switching state of the SHWP 510 is either active or non-active. In some embodiments, when active, the SHWP 510 may reverse the handedness of circularly polarized incident light, and when non-active, the SHWP 510 may transmit the circularly polarized light without affecting the handedness. For example, when the circularly polarized incident light is a LHCP light, the SHWP 510 in the active state may output a RHCP light, while the SHWP in the non-active state may output a LHCP light. Because the optical state of a passive PBP LC grating 520 is determined by the handedness of circularly polarized light incident on the passive PBP LC grating 520, a SHWP 510 placed before a PBP LC grating 520 in optical series may be able to control whether the PBP LC grating 520 operates in an additive or negative state by controlling the handedness of the circularly polarized light incident onto the PBP LC grating 520. That means with one SHWP 510 and a PBP LC grating 520 a switchable light beam steering with two steering angles may be obtained.

Further, to decrease the steering interval between the angles and enhance the steering angle, the PBP grating assembly 500 may include more than one PBP LC gratings 520 and SHWPs 510. Each pair of a PBP LC grating 520 and a SHWP 510 placed before the PBP LC grating 520 in optical series may provide two optical states. In some embodiments, with P number of PBP LC gratings 520 included in the PBP grating assembly 500, a total number of $2^P$ steering states may be provided, where P is a positive integer. In some embodiments, provided that in a P-stage PBP grating assembly 500 that includes P number of PBP LC gratings 520, a steering angle $SA_P$ of the $P^{th}$ stage PBP LC grating 520 is configured to be $SA_P=\pm SA_1\times 2^{(P-1)}$, then a total steering angle SA of the P-stage PBP grating assembly 500 may be calculated as $$SA = \pm \sum_{i=1}^{P} SA_1 \times 2^{(i-1)},$$

where $SA_1$ is the steering angle of the $1^{st}$ stage PBP LC grating 520. That is, the circular polarized incident light may be steered to a maximum angle of $$SA = \pm \sum_{i=1}^{P} SA_1 \times 2^{(i-1)}$$

by the P-stage PBP grating assembly 500.

Thus, by switching the SHWPs, the steering state of the PBP grating assembly 500 may be changed and, accordingly, the steering angle of the light beam incident onto the PBP grating assembly 500 may be changed. For example, as shown in FIG. 5, the PBP grating assembly 500 may be a 4-stage PBP grating assembly (i.e., P=4) including four PBP LC gratings 500 (i.e., PBP 1 to PBP4) and four SHWPs 510 (i.e., SHWP1 to SHWP4) alternately arranged. The PBP grating assembly 500 may provide a total number of 16 steering states, i.e., 16 light beam steering angles. When the steering angles $SA_1$, $SA_2$, $SA_3$ and $SA_4$ of the $1^{st}$ stage PBP LC grating PBP1, the $2^{nd}$ stage PBP LC grating PBP2, the $3^{rd}$ stage PBP LC rating PBP3, and the $5^{th}$ stage PBP LC grating PBP4 are configured to be about ±1°, ±2°, ±4° and ±8°, respectively, the maximum steering angle provided by the PBP grating assembly 500 may be about +15°.

FIG. 5 shows the polarization track of a steering state of the PBP grating assembly 500 that provides a +15° steering angle for a normally incident RHCP light. For illustrative purposes, FIG. 5 shows that the PBP LC gratings PBP 1 to PBP4 are all right-handed passive PBP LC gratings. Light 505 incident onto the SHWP1 may be a RHCP light and the SHWP1 may be in a non-active state or an off-state and, thus, light 515 transmitted through the SHWP1 may remain as a RHCP light, which is incident onto the PBP1 along the optical axis (e.g., z-axis) of the PBP grating assembly. Because the PBP1 is a right-handed PBP LC grating, the RHCP light 515 incident on the PBP1 may be diffracted by about 1° and become a LHCP light 525 after passing through the PBP1. The SHWP2 may be in an active state or an on-state and, thus, the LHCP light 525 may be converted to a RHCP light 535 after passing through the SHWP2. Because the PBP2 is a right-handed PBP LC grating, the RHCP light 535 incident on the PBP2 may be diffracted by about 4° and become a LHCP light 545 after passing through the PBP2. The SHWP3 may be in an active state or an on-state and, thus, the LHCP light 545 may be converted to a RHCP light 555 after passing through the SHWP3. Because the PBP3 is a right-handed PBP LC grating, the RHCP light 555 incident on the PBP3 may be diffracted by about 5° and become a LHCP light 565 after passing through the PBP3. The SHWP4 may be in an active state or an on-state and, thus, the LHCP light 565 may be converted to a RHCP light 575 after passing through the SHWP4. Because the PBP4 is a right-handed PBP LC grating, the RHCP light 575 incident on the PBP3 may be diffracted by about 8° and become a LHCP light 585 after passing through the PBP4. Thus, as compared to the incident RHCP light 505 along the optical axis (e.g., z-axis) of the PBP grating assembly, the outgoing LHCP light 585 may be diffracted by about 15° (1°+2°+4°+8°=15°, i.e. resulting a steering angle θ of about 15°.

For illustrative purposes, FIG. 5 shows the polarization track of a steering state of the PBP grating assembly 500 that provides a 15° steering angle. The polarization track of the 16 steering states of the PBP LC grating 500 can be referred to the table shown in FIG. 10. As shown in FIG. 10, SHWP stands for a switchable half-wave plate, 1 indicates that the SHWP changes the handedness of the incident circularly polarized light or at an on-state, and 0 indicates that the SHWP maintains the handedness of the incident circularly polarized light or at an off-state. Through controlling the on-state and off-state of the SHWPs, the PBP LC grating 500 may be configured to have sixteen steering states and, accordingly, the corresponding steering angle θ may have sixteen different values. A beam steering between −15° to +15° with 2° interval may be realized. Referring to FIG. 5 and FIG. 9, FIG. 5 shows the polarization track for the 16$^{th}$ steering state (01111) of the PBP grating assembly where the resulting steering angle is 15°. It should be noted that, FIG. 5 shows a configuration of the PBP grating assembly 500 to realize a beam steering between −15° to +15° with 2° interval, which is for illustrative purposes and is not intended to limit the scope of the present disclosure. In some embodiments, the PBP grating assembly 500 may only include one or two or any appropriate number of PBP LC gratings to realize the beam steering between −15° to +15°. In practical applications, the configuration of the PBP grating assembly 500 may be determined according to various application scenarios, and the PBP grating assembly 500 may be configured to realize any appropriate number of steering states and any appropriate value of steering angles.

In some embodiments, the PBP LC gratings 520 included in the PBP grating assembly 500 may be all right-handed PBP LC gratings. In some embodiments, the PBP LC gratings 520 included in the PBP grating assembly 500 may be all left-handed PBP LC gratings. In some embodiments, the PBP grating assembly 500 may include both a right-handed PBP LC grating and a left-handed PBP LC grating. In some embodiments, the PBP LC gratings 520 included in the PBP grating assembly 500 may be all passive PBP LC gratings. In some embodiments, the PBP LC gratings 520 included in the PBP grating assembly 500 may be all active PBP LC gratings. In some embodiments, the PBP grating assembly 500 may include both a passive PBP LC grating and an active PBP LC grating.

In some embodiments, each PBP LC grating 520 may have a uniform grating pitch, such that the PBP LC grating 520 deflects light in a similar manner to a prism. Individual PBP LC grating 520 in the PBP grating assembly 500 may each have a different grating pitch to provide different degrees of deflection. In some embodiments, the PBP grating assembly 500 may include two sets of stacked PBP LC gratings 520 which deflect light in orthogonal directions, such that the light beam may be steered over two axes. In some embodiments, the PBP LC grating 520 may have a spatially nonuniform grating pitch. The nonuniform grating pitch may be prescribed, for example, to correct optical aberrations in the display system, or control image focus.

For illustrative purposes, FIG. 5 shows the light 505 incident onto the SHWP1 may be a RHCP light. when the light emitted from a light source is an unpolarized light, the PBP grating assembly 500 may further include a right-handed circular polarizer 530 that is arranged before the first SHWP 510 (e.g., SHWP1) in optical series. The right-handed circular polarizer 530 may convert the unpolarized light to the RHCP light 505. In some embodiments, the PBP grating assembly 500 may further include a SHWPS and a right-handed circular polarizer 540 that is arranged after the last PBP LC grating 520 (e.g., PBP4) in optical series. The SHWP5 may be arranged between the last PBP LC grating 520 (e.g., PBP4) and the right-handed circular polarizer 540.

The SHWP5 and the right-handed circular polarizer 540 may be configured to further reduce or eliminate the light leakage at undesired diffraction order that has an opposite handedness compare to the handedness of the desired diffraction order. For example, the SHWP5 may be in an active state or an on-state and, thus, the LHCP light 585 may be converted to a RHCP light 595 after passing through the SHWPS. The RHCP light 595 may be transmitted through the right-handed circular polarizer 540 and become a RHCP light 505. Given the LHCP light 585 is a desired diffraction order, then an undesired diffraction order may be a RHCP light, which is converted to a LHCP after passing through the SHWPS and blocked by the right-handed circular polarizer 540. Thus, the undesired diffraction order of RHCP light may be eliminated and no longer observed or detected.

Figure 11:
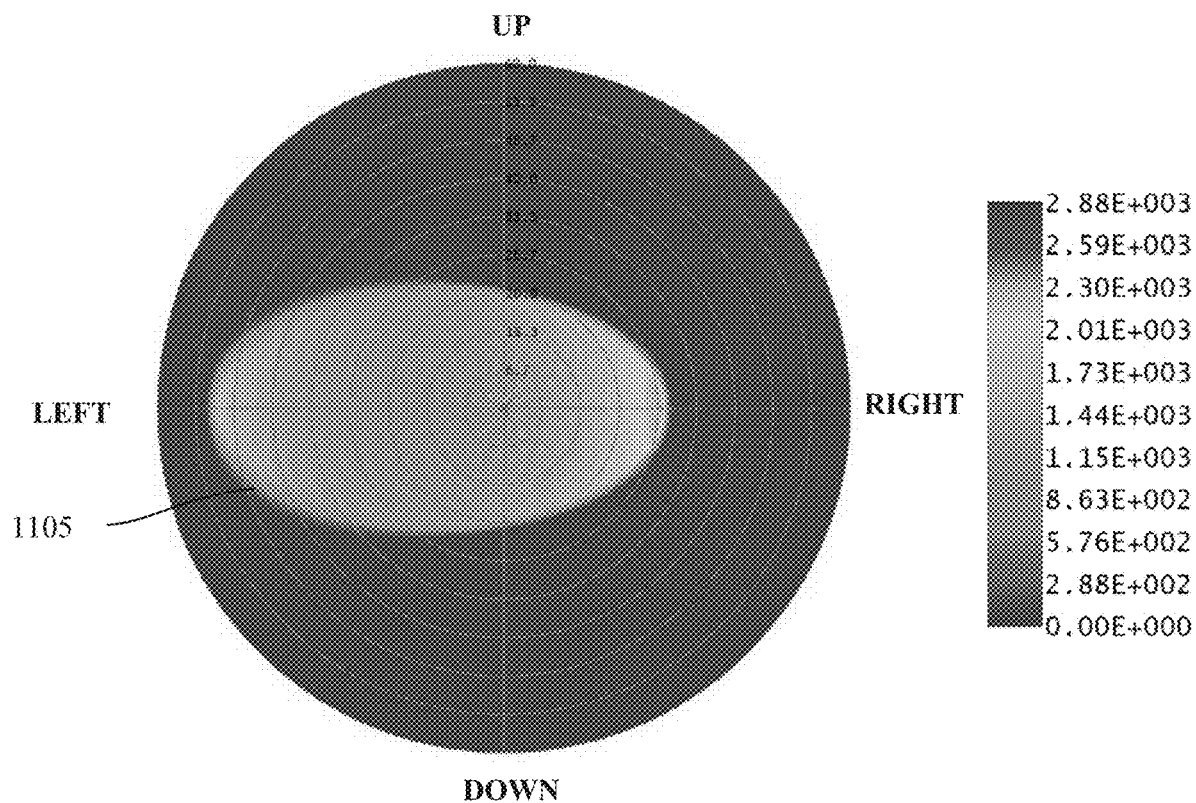
FIG. 11 illustrates a simulated observable field of view ("FOV") of the NED at a steering state of the LC steering assembly according to an embodiment of the disclosure.
Figure 12:
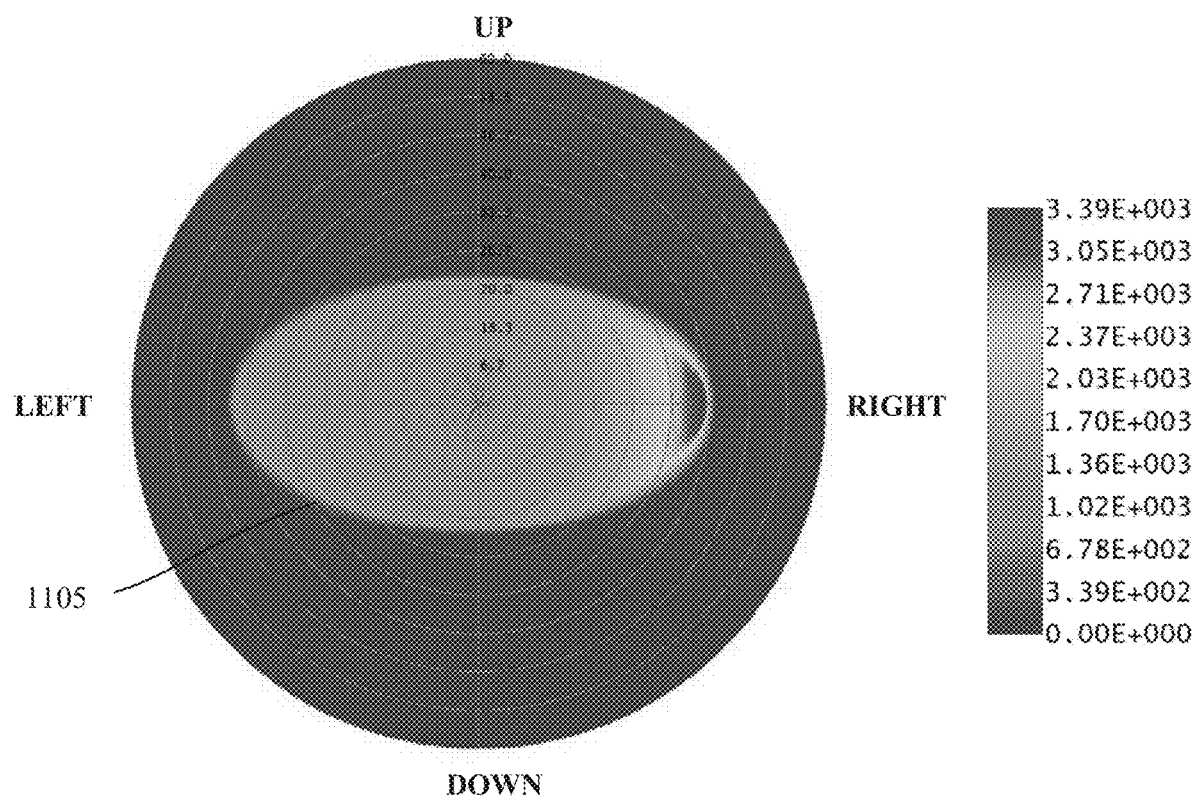
FIG. 12 illustrates a simulated observable FOV of the NED at another steering state of the LC steering assembly according to an embodiment of the disclosure.
Figure 13:
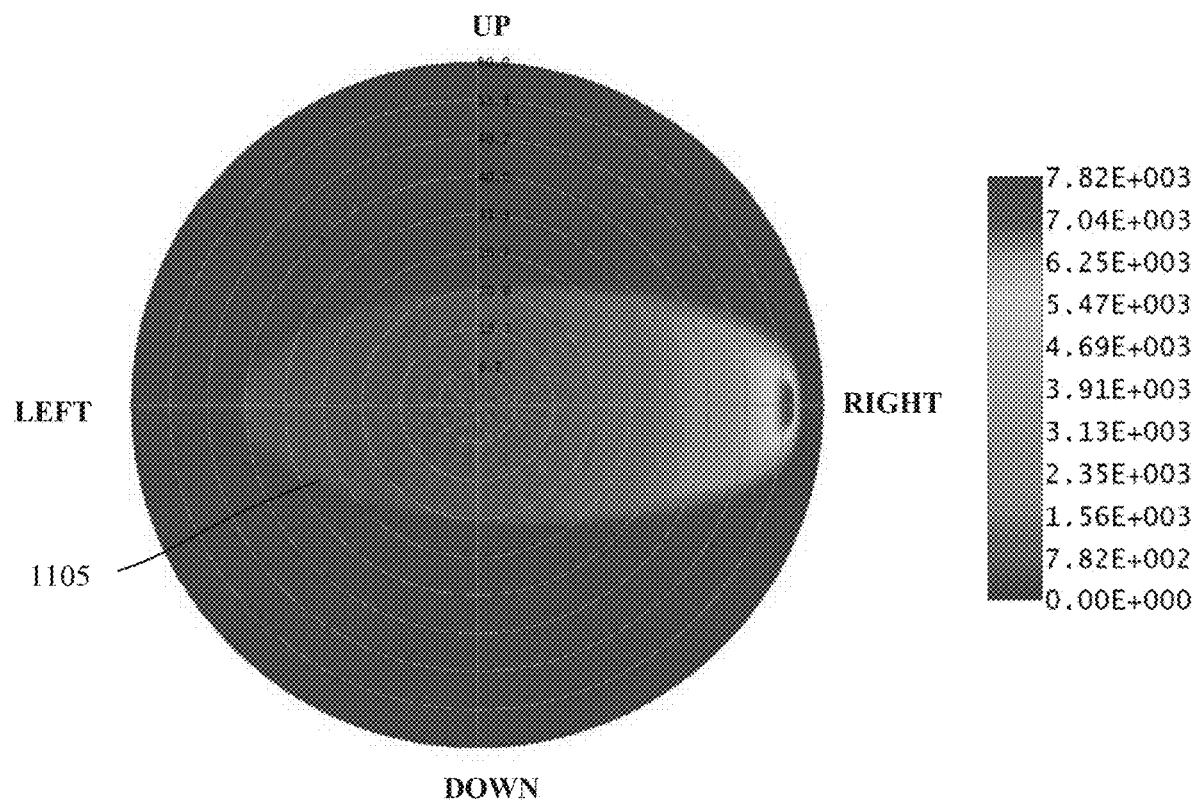
FIG. 13 illustrates a simulated observable FOV of the NED at another steering state of the LC steering assembly according to an embodiment of the disclosure.

FIGS. 11-13 illustrate a Zemax simulated observable FOV of the NED 100 at various steering states of the PBP grating assembly 500. The observable FOV may be the FOV observed by the eye of the user via the exit pupil at the eye-box. In FIGS. 11-13, the observable FOV is labeled as reference number 1105. The horizontal and the vertical axes represent the size of the FOV in a unit of degree)(°. The right direction and the up direction are defined as the positive directions, and the left direction and the down direction are defined as the negative directions. The origin of the coordinate system represents zero FOV, and the nine circles centered on the origin of the coordinate system represent 6.7° FOV, 13.3° FOV, 20.0° FOV, 26.7° FOV, 33.3° FOV, 40.0° FOV, 46.7° FOV, 53.3° FOV and 60° FOV respectively, from the inside to the outside. The colors denote the radiant intensity in arbitrary units per steradian, as the color bar shows, where the blue color denotes a lower radiant intensity and the red color denotes a higher radiant intensity.

Referring to FIG. 2 and FIGS. 11-13, the observable FOV 1105 may be the FOV observed by the eye pupil 245 at the eye-box 230, the position and/or shape of which may be changed as the positions of the plurality of exit pupils (e.g., M spots) are changed. As discussed above, the position and/or shape change of the observable FOV 1105 may be controlled by the controller 240, which may control the PBP grating assembly 500 to switch the steering angle of the light beam (i.e., steering state) based on the position of the eye pupil 245 as tracked by the eye-tracking device 235, thereby shifting the positions of the plurality of exit pupils at the eye-box 230.

As shown in FIG. 11, the observable FOV 1105 may be located to the left from the origin of the coordinate system (i.e., center of the nine circles). The observable FOV 1105 may have an approximately oval shape that is centered at about (−10°, 0). The observable FOV 1105 may have an edge point at about 26.7° in the right direction, an edge point at about −50° in the left direction, an edge point at about 23° in the up direction, and an edge point at about −23° in the down direction. That is, when the eye of the user is positioned at the exit pupil, an FOV of about 75° in the horizontal direction and about 46° in the vertical direction may be provided by the NED. The highest radiant intensity at the FOV is about 2880 (arbitrary units per steradian).

As described above, the NED may shift the exit pupils based on the tracked position of the eye. Accordingly, the observable FOV 1105 may also be shifted to different location at different time instances when the position of the eye changes. A variation of the observable FOV 1105 may be predicted according to the exit pupil position. For example, when the exit pupil is shifted in a positive direction, the entire observable FOV 1105 may tend to shift in a positive direction as well, and vice versa.

FIG. 12 illustrates another position of the observable FOV 1105 at another time instance when the position of the eye changes. As shown in FIG. 12, the observable FOV 1105 has been shifted to the right from the position shown in FIG. 11 to track the position of the eye. The observable FOV 1105 may be centered near the origin of the coordinate system shown in FIG. 12. At this time instance, the observable FOV 1105 may have an approximately oval shape that has an edge point at about 40° in the right direction, an edge point at about −42° in the left direction, an edge point at about 23° in the up direction, and an edge point at about −23° in the down direction. That is, when the eye of the user is positioned at the exit pupil, an FOV of about 82° in the horizontal direction and about 46° in the vertical direction may be provided by the NED. Compared to the observable FOV 1105 in FIG. 11, the observable FOV 1105 in FIG. 12 has been expanded in the horizontal direction by about 7°. The highest radiant intensity at the FOV is about 3390 (arbitrary units per steradian).

Not only the position of the observable FOV 1105 may be shifted, the shape and/or size of the FOV 1105 may also be changed according to the position of the exit pupil. FIG. 13 illustrates another position of the observable FOV 1105 at another time instance when the position of the eye changes. As shown in FIG. 13, the observable FOV 1105 has been shifted to the right from the position shown in FIG. 12. In addition, the oval shape of the observable FOV 1105 also has been obviously elongated in the horizontal direction. The observable FOV 1105 has an edge point at about −40° in the left direction, an edge point at about 55° in the right direction, an edge point at about 23° in the up direction, and an edge point at about −23° in the down direction. That is, when the eye of the user is positioned at the exit pupil, an FOV of about 95° in the horizontal direction and about 46° in the vertical direction may be provided by the NED. The highest radiant intensity at the FOV is about 7820 (arbitrary units per steradian).

For illustrate purposes, FIGS. 11-13 illustrate the movement of the eye is in the horizonal direction (from left to right in FIGS. 11-13) and, accordingly, the observable FOV also shifts in the horizontal direction, creating an expanded eye-box area. In some embodiments, the eye may move in one of the vertical direction and horizonal direction, the exit pupils generated by the image combiner at the eye-box may also be shifted in a corresponding direction. In some embodiments, the NED may include a switchable HOE image combiner, which is capable of generating a plurality of exit pupils disposed in the horizonal direction or a plurality of exit pupils disposed in the vertical direction at the eye-box in accordance with a switching state of the HOE image combiner. In some embodiments, the image combiner may include two HOEs, which are configured to generate a plurality of exit pupils in the horizontal direction and a plurality of exit pupils in vertical direction at the eye-box, respectively. The two HOEs may be individually controlled to be activated. When the eye-tracking device detects the movement direction (e.g., horizontal or vertical) of the eye, the HOE responsible for generating the exit pupils in the corresponding direction may be activated while the other HOE may be deactivated or remain deactivated. In some embodiments, the eye may move in an oblique direction, the two HOEs may be both activated to generate exit pupils in accordance with the position of the eye.

Figure 14:
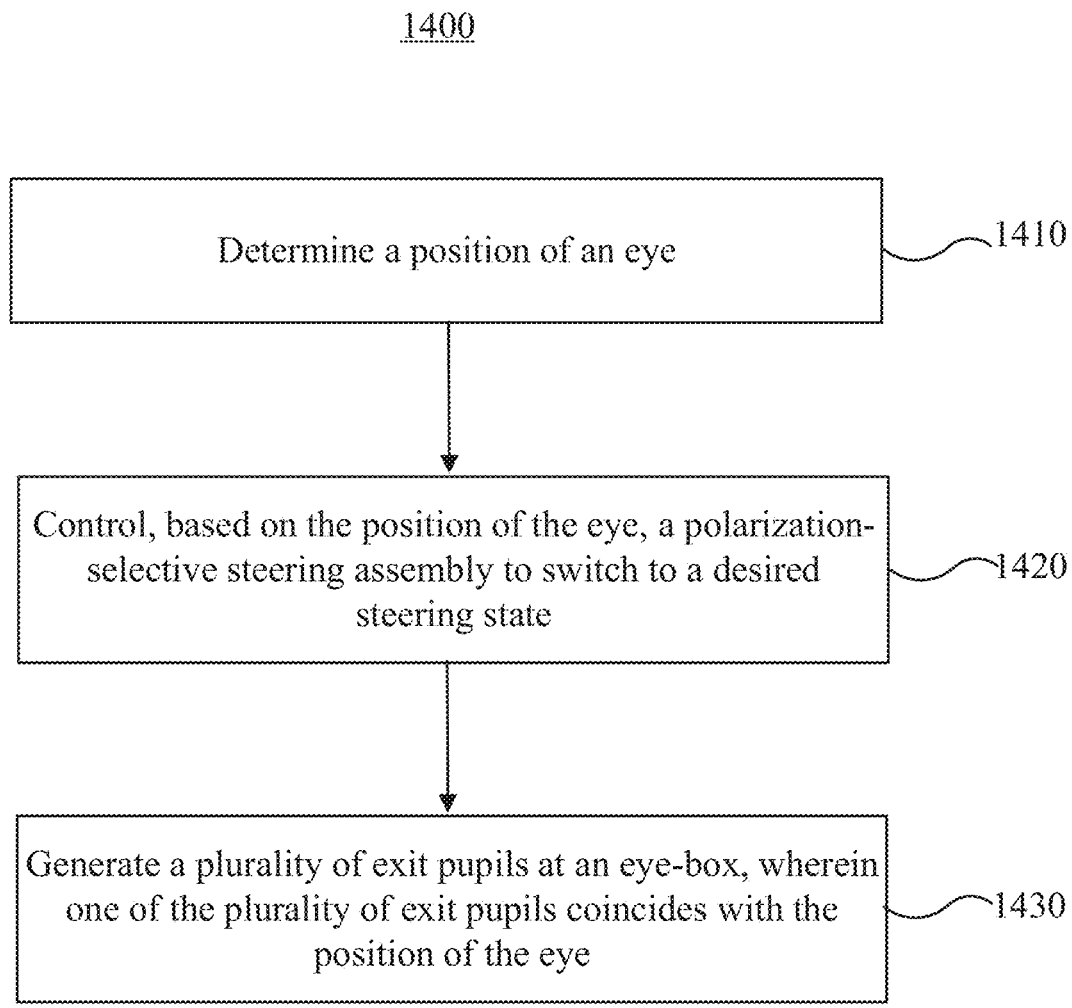
FIG. 14 illustrates a flow chart of a method of pupil steering in a NED according to an embodiment of the disclosure.

FIG. 14 illustrates a flow chart of a method of pupil steering in a NED according to an embodiment of the disclosure. As shown in FIG. 14, the method 1400 may include determining a position of an eye (Step 1410). For example, the eye-tracking device 235 may track a movement of an eye of a user of the NED to determine the position of the eye. The method 1400 may also include controlling, based on the position of the eye, a polarization selective steering assembly to switch to a desired steering state (Step 1420). The method 1400 may also include generating a plurality of exit pupils at an eye-box by an image combiner, wherein one of the plurality of exit pupils substantially coincides with the position of the eye (Step 1430). For example, in the NED in FIG. 2, the controller 240 may receive a feedback signal from the eye-tracking device 235 regarding the real-time eye position, and may control the PBP grating assembly 230 to switch to a desired steering state, such that a plurality of exit pupils may be simultaneously generated by the image combiner 225 at the eye-box 230 of the NED. One of the plurality of exit pupils may substantially coincide with the position of the user's eye. The details may be referred to the description of the NED system, which are not repeated herein.

In the disclosed embodiments, the light beam emitted from the light source may be deflected by the front light HOE to illuminate the SLM. The light path may be folded by the front light HOE, and the size of the front light HOE and the light source may be made sufficiently small to achieve a compact form factor. The polarization-selective grating assembly may be configured to provide a plurality of steering states for the modulated light beam received from the SLM. The polarization-selective grating assembly may be compact with a thickness of several millimeters to reduce the form factor of the near-eye display. In addition, through using half-wave plates having a fast switching speed, for example, on an order of millisecond, the switching speed of the polarization-selective grating assembly when switching between different steering states may be sufficiently fast to keep pace with the movement of the eye, such that real-time eye-tracking and real-time shifting of the exit pupils may be realized.

The HOE image combiner may be configured to focus the light beam steered by the polarization-selective grating assembly to a plurality of exit pupils simultaneously (i.e., generate a plurality of multiplexed exit pupils) at the eye-box of the near-eye display, such that the number of the steering states provided by the polarization-selective grating assembly may be reduced, thereby further reducing the thickness of the polarization-selective grating assembly. In addition, each of the multiplexed exit pupils generated by the HOE image combiner may be corrected for aberration during the exposure of the HOE, such that the exit pupil aberration for shifting may be minimized, and the image quality of the NED may be significantly enhanced.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a non-transitory computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein. Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical device, comprising:
a light source configured to provide a light beam;
a spatial light modulator ("SLM") configured to modulate the light beam for generating a display image;
a polarization-selective steering assembly configured to provide a plurality of steering angles for the modulated light beam received from the SLM; and
a holographic optical element ("HOE") image combiner configured to receive the modulated light beam steered by the polarization-selective steering assembly, wherein for the modulated light beam incident onto the HOE image combiner at each of the steering angles, the HOE image combiner is configured to backwardly diffract the modulated light beam to a plurality of exit pupils at an eye-box of the optical device.

2. The optical device of claim 1, further comprising:
an eye-tracking device configured to provide eye tracking information of an eye of a user.

3. The optical device of claim 2, further comprising:
a controller configured to:
receive the eye tracking information from the eye-tracking device;
determine a position of the eye of the user; and
control, based on the position of the eye, the polarization-selective steering assembly to provide a predetermined steering angle, such that one of the exit pupils to which the modulated light beam propagates through substantially coincides with the position of the eye of the user.

4. The optical device of claim 1, wherein the HOE image combiner is configured to operate at a plurality of wavelengths.

5. The optical device of claim 1, wherein the HOE image combiner is configured to be angularly selective to change a count and/or positions of the exit pupils to which the modulated light beam is focused as a steering angle changes.

6. The optical device of claim 1, wherein the HOE image combiner is configured to change a depth of the exit pupils as a steering angle changes.

7. The optical device of claim 1, wherein the HOE image combiner includes a plurality of multiplexed angularly selective holograms configured to provide an optical prescription that changes as a function of an incidence angle of the modulated light beam at the HOE image combiner.

8. The optical device of claim 1, wherein depths of the exit pupils vary among the exit pupils.

9. The optical device of claim 1, wherein depths of the exit pupils are patterned to account for eye rotation around a nominal position.

10. The optical device of claim 1, wherein the polarization-selective steering assembly includes at least one liquid crystal ("LC") steering element.

11. The optical device of claim 10, wherein the at least one LC steering element is configured to operate at a plurality of wavelengths.

12. The optical device of claim 10, wherein the at least one LC steering element includes one of an optical phased array ("OSA"), a switchable Bragg grating, an index matched surface relief grating, or a Pancharatnam-Berry Phase ("PBP") LC grating.

13. The optical device of claim 1, wherein the polarization-selective steering assembly includes two LC steering elements configured to steer the modulated light beam over two axes.

14. The optical device of claim 1, wherein the polarization-selective steering assembly includes a plurality of Pancharatnam-Berry Phase ("PBP") LC steering elements, each of the PBP LC steering elements having a spatially varying pitch.

15. The optical device of claim 1, wherein the polarization-selective steering assembly includes a metasurface steering element.

16. The optical device of claim 1, wherein the polarization-selective steering assembly is configured to steer the modulated light beam having different polarizations to different steering angles.

17. The optical device of claim 1, further comprising:
 a front light HOE configured to deflect the light beam received from the light source towards the SLM.

18. The optical device of claim 1, wherein:
 the optical device is a component of a holographic near-eye display.

19. The optical device of claim 1, wherein the polarization-selective steering assembly includes a plurality of Pancharatnam-Berry Phase ("PBP") LC steering elements and a plurality of switchable half-wave plates alternately arranged in a stack.

20. A method, comprising:
 determining, by an eye-tracking device, a position of an eye at an eye-box;
 modulating, by a spatial light modulator, a light beam for generating a display image;
 controlling, by a controller, based on the position of the eye, a polarization-selective steering assembly configured to provide a plurality of steering angles for the modulated light beam received from the spatial light modulator to provide a predetermined steering angle; and
 receiving, by a holographic optical element ("HOE") image combiner, the modulated light beam steered by the polarization-sensitive steering assembly, and for the modulated light beam incident onto the HOE image combiner at each of the steering angles, backwardly diffracting, by the HOE image combiner, the modulated light beam to a plurality of exit pupils at the eye-box.

* * * * *